(12) United States Patent
Deng

(10) Patent No.: US 11,356,515 B2
(45) Date of Patent: *Jun. 7, 2022

(54) SYSTEM AND METHOD FOR ESTABLISHING CONNECTION BETWEEN DEVICES

(71) Applicant: ZHEJIANG DAHUA TECHNOLOGY CO., LTD., Zhejiang (CN)

(72) Inventor: Zhiji Deng, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/194,325

(22) Filed: Mar. 8, 2021

(65) Prior Publication Data
US 2021/0194972 A1  Jun. 24, 2021

(30) Foreign Application Priority Data

Nov. 23, 2016 (CN) .......................... 201611040923.5
Nov. 23, 2016 (CN) .......................... 201611043436.4

(51) Int. Cl.
*H04L 67/141* (2022.01)
*H04L 67/12* (2022.01)
(Continued)

(52) U.S. Cl.
CPC ............ *H04L 67/141* (2013.01); *H04L 67/12* (2013.01); *H04L 67/34* (2013.01); *H04N 5/765* (2013.01); *H04N 7/183* (2013.01); *H04L 67/04* (2013.01)

(58) Field of Classification Search
CPC ....... H04L 67/141; H04L 67/12; H04L 67/34; H04L 67/04; H04N 5/765; H04N 7/183
See application file for complete search history.

(56) References Cited

U.S. PATENT DOCUMENTS

2004/0123316 A1   6/2004  Kendall et al.
2006/0233167 A1  10/2006  McAllister et al.
(Continued)

FOREIGN PATENT DOCUMENTS

CN      101018122 A      8/2007
CN      101583054 A     11/2009
(Continued)

OTHER PUBLICATIONS

International Search Report in PCT/CN2017/098158 dated Nov. 15, 2017, 4 pages.
(Continued)

*Primary Examiner* — Joe Chacko
(74) *Attorney, Agent, or Firm* — Metis IP LLC

(57) ABSTRACT

The present disclosure relates to systems and methods for establishing connection between devices. One or more first parameters relating to a first device may be determined. The first device may have a first operation mode and a second operation mode. The one or more first parameters may include a duration of the first operation mode and a duration of the second operation mode. One or more second parameters relating to a second device may be determined. The second device may have a third operation mode. The one or more second parameters relating to the second device may include a duration of the third operation mode. A connection between the first device and the second device may be established based on the one or more first parameters and the one or more second parameters.

20 Claims, 17 Drawing Sheets

100

(51) Int. Cl.
  *H04L 67/00* (2022.01)
  *H04N 7/18* (2006.01)
  *H04N 5/765* (2006.01)
  *H04L 67/04* (2022.01)

(56) References Cited

U.S. PATENT DOCUMENTS

| | | | |
|---|---|---|---|
| 2007/0297438 A1 | 12/2007 | Meylan et al. | |
| 2009/0067389 A1* | 3/2009 | Lee | H04W 74/02 370/336 |
| 2010/0007770 A1 | 1/2010 | Koganezawa et al. | |
| 2012/0110217 A1 | 5/2012 | Christiansen et al. | |
| 2012/0236875 A1 | 9/2012 | Vijayasankar et al. | |
| 2012/0252363 A1* | 10/2012 | Zhang | H04B 5/0031 455/41.1 |
| 2015/0015719 A1 | 1/2015 | Campana | |
| 2017/0346908 A1* | 11/2017 | Shang | H04L 67/025 |

FOREIGN PATENT DOCUMENTS

| | | |
|---|---|---|
| CN | 102651777 A | 8/2012 |
| CN | 103997448 A | 8/2014 |
| CN | 104796306 A | 7/2015 |
| CN | 105813010 A | 7/2016 |
| CN | 106534691 A | 3/2017 |
| CN | 106534788 A | 3/2017 |
| WO | 2016103556 A1 | 6/2016 |
| WO | 2018036436 A1 | 3/2018 |

OTHER PUBLICATIONS

Written Opinion in PCT/CN2017/098158 dated Nov. 15, 2017, 4 pages.
The Extended European Search Report in European Application No. 17874552.7 dated Jul. 3, 2019, 10 pages.
Qiao, Daji et al.. Smart Power-saving Mode for IEEE 802.11 Wireless LANs, Proceedings IEEE 24th Annual Joint Conference of the IEEE Computer and Communications Societies, 3: 1573-1583, 2005.
The Communication Pursuant to Article 94(3) EPC in European Application No. 17874552.7 dated Mar. 15, 2021, 10 pages.
First Office Action in Chinese Application No. 201611040923.5 dated Nov. 23, 2018, 10 pages.
First Office Action in Chinese Application No. 201611043436.4 dated Nov. 16, 2018, 9 pages.

* cited by examiner

100

SYSTEM AND METHOD FOR ESTABLISHING CONNECTION BETWEEN DEVICES

CROSS-REFERENCE TO RELATE APPLICATION

This application is a Continuation of U.S. application Ser. No. 16/420,392, filed on May 23, 2019, which is a continuation of International Application No. PCT/CN2017/098158 filed on Aug. 18, 2017, which claims priority of Chinese Patent Application No. 201611040923.5 filed on Nov. 23, 2016, and Chinese Patent Application No. 201611043436.4 filed on Nov. 23, 2016. Each of the above-referenced applications is expressly incorporated by reference in their entireties.

TECHNICAL FIELD

The present disclosure generally relates to communication technology, and more particularly, to a system and method for establishing connection between devices.

BACKGROUND

An electrical device may have multiple operation modes. In order to make a connection between multiple electrical devices, the operation modes of the electrical devices may need to be matched. Conventionally, the matching of operation modes of multiple electrical devices may need to be performed manually and/or take a long time. Thus, it may be desirable to develop a system and method that may match operation modes of electrical devices automatically and efficiently.

SUMMARY

According to an aspect of the present disclosure, a system is provided. The system may include at least one processor, and at least one non-transitory computer-readable storage medium storing a set of instructions. The set of instructions, when executed by the at least one processor, cause the system to perform the following operations. The system may determine one or more first parameters relating to a first device. The first device may have a first operation mode and a second operation mode, and the one or more first parameters relating to the first device may include a duration of the first operation mode and a duration of the second operation mode. The system may determine one or more second parameters relating to a second device. The second device may have a third operation mode, and the one or more second parameters relating to the second device may include a duration of the third operation mode. The system may establish a first connection between the first device and the second device based on the determined one or more first parameters relating to the first device and the determined one or more second parameters relating to the second device. The duration of the third operation mode of the second device may be greater than a sum of the duration of the first operation mode and the duration of the second operation mode of the first device.

In some embodiments, the set of instructions, when executed by the at least one processor, cause the system to perform the following operations. The system may switch an operation mode of the first device to the first operation mode. The system may operate the second device in the third operation mode. The system may determine whether the first operation mode of the first device is the same as the third operation mode of the second device. The system may establish, in response to the determination that the first operation mode of the first device is the same as the third operation mode of the second device, the first connection between the first device and the second device.

In some embodiments, the set of instructions, when executed by the at least one processor, cause the system to switch, in response to the determination that the first operation mode of the first device is different from the third operation mode of the second device, the operation mode of the first device from the first operation mode to the second operation mode based on the one or more first parameters relating to the first device.

In some embodiments, the first device may further have a fifth operation mode. The one or more first parameters relating to the first device may further include a duration of the fifth operation mode of the first device. The set of instructions, when executed by the at least one processor, cause the system to perform the following operations. The system may be caused to determine that the second operation mode of the first device is different from the third operation mode of the second device. The system may be caused to switch, in response to the determination that the second operation mode of the first device is different from the third operation mode of the second device, the operation mode of the first device from the second operation mode to the fifth operation mode based on the one or more first parameters relating to the first device.

In some embodiments, the second device may further have a fourth operation mode. The one or more second parameters relating to the second device may include a duration of the fourth operation mode of the second device. The duration of the fourth operation mode of the second device may be greater than a sum of the duration of the first operation mode and the duration of the second operation mode of the first device. The set of instructions, when executed by the at least one processor, cause the system to perform the following operations. The system may determine that the first operation mode of the first device is different from the third operation mode of the second device. The system may switch, in response to the determination that the first operation mode of the first device is different from the third operation mode of the second device, the operation mode of the second device from the third operation mode to the fourth operation mode based on the one or more second parameters relating to the second device.

In some embodiments, the first device may be an IP camera and the second device may be a network video storage, or the first device may be the network video storage and the second device may be the IP camera.

In some embodiments, the duration of the first operation mode of the first device may be equal to or greater than twice a time needed for the establishing a first connection between the first device and the second device when the first device operates in the first operation mode.

In some embodiments, the second device may further have a sixth operation mode, and the one or more second parameters relating to the second device may further include a duration of the sixth operation mode of the second device. When executed by the at least one processor, cause the system to perform the following operations. The system may determine that an operation criterion of the first device is not satisfied. The system may switch, in response to the determination that the operation criterion of the first device is not satisfied, the operation mode of the first device from the first operation mode to the second operation mode. The system may switch the operation mode of the second device from the third operation mode to the sixth operation mode based on the one or more second parameters relating to the second device. The system may determine whether the second operation mode of the first device is the same as the sixth operation mode of the second device. The system may establish, in response to the determination that the second operation mode of the first device is the same as the sixth operation mode of the second device, a second connection between the first device and the second device.

In some embodiments, the first device may have a first data transmission speed in the first operation mode and a second data transmission speed in the second operation mode. The second data transmission speed may be higher than or equal to the first data transmission speed.

In some embodiments, the set of instructions, when executed by the at least one processor, cause the system to keep the first device operating in the second operation mode for a time longer than a sum of the duration of the third operation mode and the duration of the sixth operation mode.

According to another aspect of the present disclosure, a method is provided. The method may include the following operations. One or more first parameters relating to a first device may be determined. The first device may have a first operation mode and a second operation mode, the one or more first parameters relating to the first device may include a duration of the first operation mode and a duration of the second operation mode. One or more second parameters relating to a second device may be determined. The second device may have a third operation mode, the one or more second parameters relating to the second device may include a duration of the third operation mode. A first connection between the first device and the second device may be established based on the one or more first parameters and the one or more second parameters.

In some embodiments, the method may further include the following operations. The operation mode of the first device may be switched to the first operation mode. It may be detected that the second device operates in the third operation mode. A determination that whether the first operation mode of the first device is the same as the third operation mode of the second device may be made. In response to the determination that the first operation mode of the first device is the same as the third operation mode of the second device, the first connection between the first device and the second device may be established.

According to another aspect of the present disclosure, a non-transitory computer-readable storage medium including instructions is provided. When the non-transitory computer-readable storage is accessed by at least one processor, causes the at least one processor to perform the following operations. The at least one processor may be caused to determine one or more first parameters relating to a first device. The first device may have a first operation mode and a second operation mode, and the one or more first parameters relating to the first device may include a duration of the first operation mode and a duration of the second operation mode. The at least one processor may be caused to determine one or more second parameters relating to a second device. The second device may have a third operation mode, and the one or more second parameters relating to the second device may include a duration of the third operation mode. The at least one processor may be caused to establish a first connection between the first device and the second device based on the one or more first parameters and the one or more second parameters. The duration of the third operation mode of the second device may be greater than a sum of the duration of the first operation mode and the duration of the second operation mode of the first device.

According to another aspect of the present disclosure, a system is provided. The system may include an operation mode module configured to determine one or more first parameters relating to a first device and determine one or more second parameters relating to a second device. The first device may have a first operation mode and a second operation mode. The one or more first parameters relating to the first device may include a duration of the first operation mode and a duration of the second operation mode. The second device may have a third operation mode. The one or more second parameters relating to the second device may include a duration of the third operation mode. The duration of the third operation mode of the second device may be greater than a sum of the duration of the first operation mode and the duration of the second operation mode of the first device. The system may also include a control module configured to switch an operation mode of the first device to the first operation mode and operate the second device in the third operation mode. The system may further include a determination module configured to determine that the first operation mode of the first device is the same as the third operation mode of the second device. The system may further include a connection module configured to establish a first connection between the first device and the second device in response to the determination that the first operation mode of the first device is the same as the third operation mode of the second device.

According to another aspect of the present disclosure, a method is provided. The method may include the following operations. One or more second parameters relating to a second device may be provided. The second device may have a third operation mode. The one or more second parameters relating to the second device including a duration of the third operation mode. A connection request may be received from a first device. The first device may have a first operation mode, a second operation mode, and one or more first parameters relating to the first device. The one or more first parameters relating to the first device may include a duration of the first operation mode and a duration of the second operation mode. The duration of the third operation mode of the second device may be greater than a sum of the duration of the first operation mode and the duration of the second operation mode of the first device. In response to the received connection request, a first connection between the first device and the second device may be established based on the one or more first parameters relating to the first device and the one or more second parameters relating to the second device.

In some embodiments, the method may include the following operations. The first device may be detected that operates in the first operation mode. The second device may be operated in the third operation mode. A determination that whether the first operation mode of the first device is the same as the third operation mode of the second device may be made. In response to the determination that the first operation mode of the first device is the same as the third operation mode of the second device, the first connection between the first device and the second device may be established.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

Figure 2A:
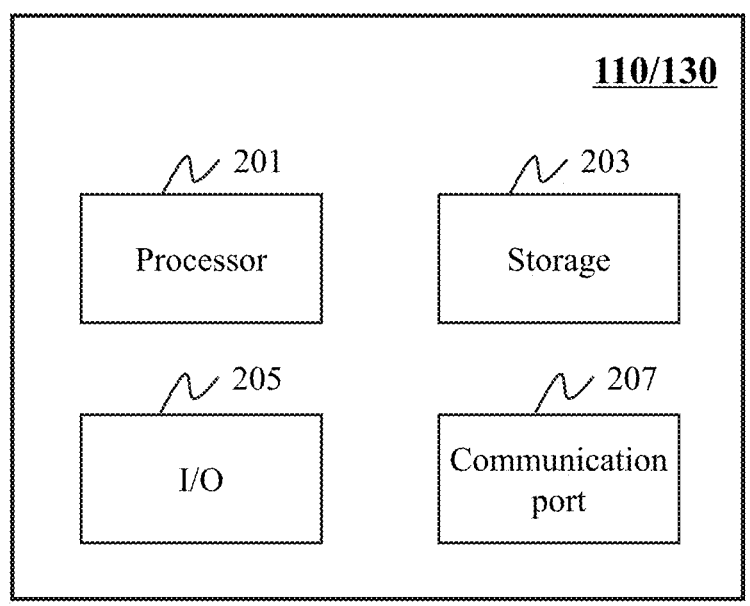
FIG. 2A is a schematic diagram illustrating exemplary hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 201 as illustrated in FIG. 2A) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, engine, module or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The present disclosure provided herein relates to relates to communication technology. Specially, the present disclosure relates to a method for establishing connection between devices in communication technology. According to some embodiments of the present disclosure, the method may include one or more following operations. One or more first parameters relating to a first device may be determined. The first device may have a first operation mode and a second operation mode. The one or more first parameters relating to the first device may include a duration of the first operation mode and a duration of the second operation mode. One or more second parameters relating to a second device may be determined. The second device may have a third operation mode. The one or more second parameters relating to the second device may include a duration of the third operation mode. A connection between the first device and the second device may be established based on the determined one or more first parameters relating to the first device and the determined one or more second parameters relating to the second device. In some embodiments, the connection between the first and the second device may be established only when an operation criterion of the first device is satisfied. In that way, the first device may operate in a satisfactory operation mode (e.g., an operation mode with the highest data transmission speed of its own operation modes).

Figure 1:
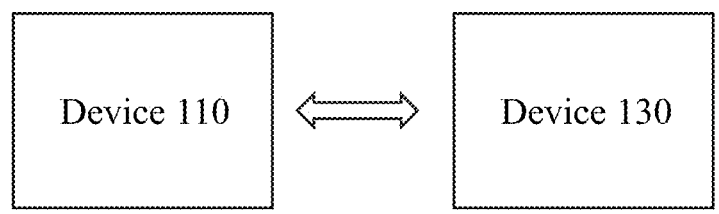
FIG. 1 illustrates a schematic diagram of a system of connectable devices according to some embodiments of the present disclosure.

FIG. 1 illustrates a schematic diagram of a system 100 of connectable devices according to some embodiments of the present disclosure. System 100 may include a device 110 and a device 130. Device 110 and/or device 130 may be any device that may connect to or communicate with other devices. Exemplary devices may include an IP camera, IP phone, a notebook computer, a storage device, or the like, or any combination thereof. Device 110 and device 130 may be of a same kind or different kinds. Merely by way of example, device 110 may be an IP camera and device 130 may be a storage device. As another example, device 130 may be an IP camera and device 110 may be a storage device.

Device 110 and/or device 130 may have one or more operation modes. Device 110 in different operation modes may have the same operational characteristic or different operational characteristics. Device 130 in different operation modes may have the same operational characteristic or different operational characteristics. Exemplary operational characteristics may include data transmission speed, data transmission distance, bandwidth, or the like, or any combination thereof. The number of operation modes of device 110 and/or device 130 may be any positive number (e.g., one, three, ten, etc.). The number of operation modes of device 110 and the number of operation modes of device 130 may be the same or different. In some embodiments, device 110 and device 130 may have at least one same operation mode.

Merely by way of example, device 110 or device 130 may be an IP camera. The IP camera may operate in a regular mode or an enhanced mode. The IP camera may transmit a video signal to another device (e.g., a video to a storage device, etc.). In some embodiments, the IP camera may transmit a video signal. The maximum transmission distance of a video signal may be different when the IP camera operates in different modes. The maximum transmission distance may be any positive number. Merely by way of example, the maximum transmission distance of the video signal may be greater than 300 meters when the IP camera operates in an enhanced mode; the maximum transmission distance of the video signal may be up to 100 meters when the IP camera operates in a regular mode. Descriptions regarding an exemplary IP camera with multiple operation modes and a passive converter configured to connect such an IP camera with different transmission media may be found in PCT Application No. PCT/CN2017/098124, entitled "POWER OVER ETHERNET SYSTEM, DEVICE, AND METHOD" filed on even date of the present application, the contents of which are hereby incorporated by reference.

Device 110 and/or device 130 may be configured to switch its operation modes in certain patterns respectively. The duration of each operation mode of device 110 and/or device 130 may be any positive number. The duration of each operation mode of device 110 and/or device 130 may be the same or different. The operation modes of device 110 and/or device 130 may be switched in a random sequence or in a certain sequence. For example, device 110 and/or device 130 may switch its operation mode randomly in every T milliseconds. T may be any positive integer. As another example, device 110 may switch its operation modes based on the data transmission speeds in a descending order.

Device 110 and device 130 may be connected to or communicated with each other if their operation modes are matched. The connection between device 110 and device 130 may be wired or wireless. Exemplary wired connection may include using a metal cable, an optical cable, a hybrid cable, an interface, or the like, or a combination thereof. Exemplary wireless connection may include using a local area network (LAN), a wide area network (WAN), a Bluetooth, a ZigBee, a near field communication (NFC), or the like, or a combination thereof. For instance, device 110 and device 130 may respectively include a network interface (e.g., an RJ45 connector, etc.) and the two devices may be connected via a network cable. In some embodiments, device 110 and device 130 may be connected to or communicated with each other if they operate in a same operation mode.

In order to make a connection between device 110 and device 130, the operation modes of the two devices may need to be matched. Only when the operation modes of the two devices are matched, the two devices may be communicated with each other. In some embodiments, the matching of operation modes may be performed by device 110 and/or device 130. In some embodiments, the matchings of operation modes may be performed more often by one of device 110 and device 130 than the other one. As used herein, that a matching of operation modes is performed by a device may indicate that the device performs functions relating to connection establishment (e.g., making a determination as to whether a connection may be established between two devices, initiating a connection by sending a connection request to another device), or the operation mode of the device changes to match the operation mode of the other device.

It should be noted that the above descriptions of the system of connectable devices are provided for the purposes of illustration, and not intended to limit the scope of the present disclosure. For persons having ordinary skills in the art, modules may be combined in various ways, or connected with other modules as sub-systems. Various variations and modifications may be conducted under the teaching of the present disclosure. However, those variations and modifications may not depart from the spirit and scope of this disclosure. For example, system 100 may include more than two of devices (e.g., three, five, etc.). The more than two devices may respectively have one or more operation modes. The operation modes of the more than two devices may be matched and the more than two devices may then be connected to or communicated with each other. All such modifications are within the protection scope of the present disclosure.

FIG. 2A is a schematic diagram illustrating exemplary hardware and/or software components of an exemplary computing device 200A on which the system 100 of connectable devices may be implemented according to some embodiments of the present disclosure. As illustrated in FIG. 2A, the computing device 200A may include a processor 201, a storage 203, an input/output (I/O) 205, and a communication port 207.

The processor 201 may execute computer instructions (e.g., program code) and perform functions of the system 100 of connectable devices in accordance with techniques described herein. The computer instructions may include, for example, routines, programs, objects, components, data structures, procedures, modules, and functions, which perform particular functions described herein. For example, the process 201 may match the operation modes of device 110 and device 130. In some embodiments, the processor 201 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200A. However, it should be noted that the computing device 200A in the present disclosure may also include multiple processors, thus operations and/or method steps that are performed by one processor as described in the present disclosure may also be jointly or separately performed by the multiple processors. For example, if in the present disclosure the processor of the computing device 200A executes both step A and step B, it should be understood that step A and step B may also be performed by two or more different processors jointly or separately in the computing device 200A (e.g., a first processor executes step A and a second processor executes step B, or the first and second processors jointly execute steps A and B).

The storage 203 may store data/information obtained from the device 110, the device 130, and/or any other component of the system 100 of connectable devices. In some embodiments, the storage 203 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 203 may store one or more programs and/or instructions to perform exemplary methods described in the present disclosure. For example, the storage 203 may store a program for the processing engine 140 for establish a connection between multiple devices (e.g., the device 110 and the device 130, etc.).

The I/O 205 may input and/or output signals, data, information, etc. In some embodiments, the I/O 205 may enable a user interaction with the processing engine 140. In some embodiments, the I/O 205 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 207 may be connected to a network (e.g., the network 120) to facilitate data communications. The communication port 207 may establish connections between the device 110, the device 130, and/or any other component of the system 100 of connectable devices. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 207 may be and/or include a standardized communication port, such as RS232, RS485, etc. In some embodiments, the communication port 207 may be a specially designed communication port. For example, the communication port 207 may be designed in accordance with the digital imaging and communications in medicine (DICOM) protocol.

Figure 2B:
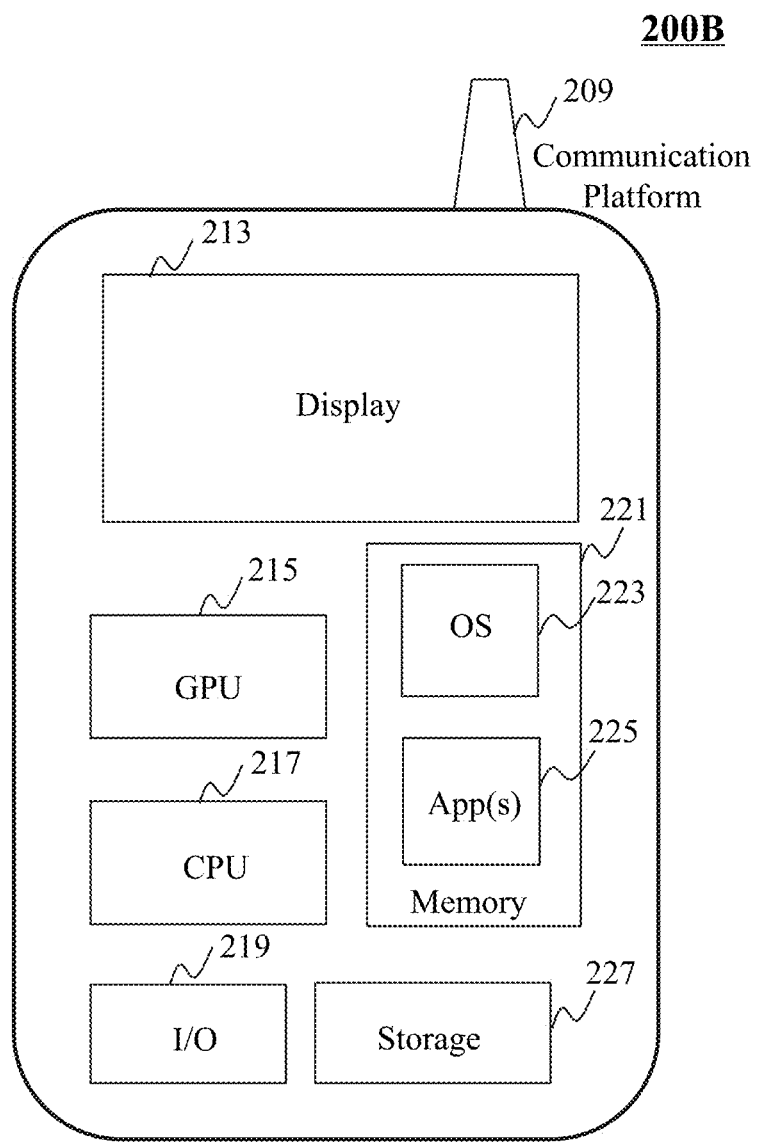
FIG. 2B is a schematic diagram illustrating exemplary hardware and/or software components of an exemplary mobile device according to some embodiments of the present disclosure.

FIG. 2B is a schematic diagram illustrating exemplary hardware and/or software components of an exemplary mobile device 200B on which the system 100 of connectable devices may be implemented according to some embodiments of the present disclosure. As illustrated in FIG. 2B, the mobile device 200B may include a communication platform 209, a display 213, a graphic processing unit (GPU) 215, a central processing unit (CPU) 217, an I/O 219, a memory 221, and a storage 227. In some embodiments, any other suitable component, including but not limited to a system bus or a controller (not shown), may also be included in the mobile device 200B. In some embodiments, a mobile operating system 223 (e.g., iOS™, Android™, Windows Phone™ etc.) and one or more applications 225 may be loaded into the memory 221 from the storage 227 in order to be executed by the CPU 215. The applications 225 may include a browser or any other suitable mobile apps for receiving and rendering information relating to image processing or other information from the system 100 of connectable devices. User interactions with the information stream may be achieved via the I/O 219 and provided to the device 110, device 130 and/or other components of the system 100 of connectable devices.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 3:
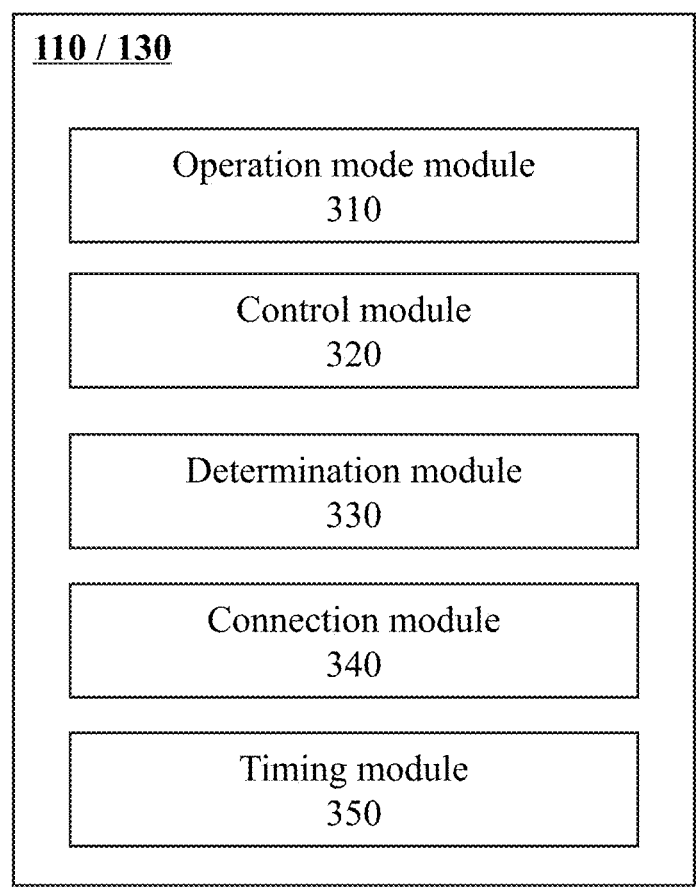
FIG. 3 is a block diagram of a connectable device according to some embodiments of the present disclosure.

FIG. 3 is a block diagram of a connectable device in system 100 according to some embodiments of the present disclosure. For illustration purposes, device 110 is described below. It should be noted that device 130 or other connectable device in system 100 (not shown in FIG. 1) may include similar components that may perform one or more functions as described with reference to device 110. As used herein, a connectable device refers to a device that may be connected with another device in system 100 when a condition is satisfied, e.g., when the operation modes of the two devices are the same.

Device 110 may include an operation mode module 310, a control module 320, a determination module 330, a connection module 340, and a timing module 350. At least two components in device 110 may be connected to or communicated with each other and/or other devices in system 100, for example, device 130. In some embodiments, the device 110 may include computing device 200A as illustrated in FIG. 2A where one or more of operation mode module 310, control module 320, determination module 330, connection module 340, and timing module 350 may be implemented. Merely by way of example, operation mode module 310, control module 320, determination module 330, and connection module 340 are implemented on computing device 200A that is part of device 110, and timing module 350 is implemented in device 110 but not as part of computing device 200A.

Operation mode module 310 may determine one or more parameters relating to one or more operation modes of a device (e.g., device 110, device 130, etc.). The one or more parameters may include the duration of an operation mode, a sequence of operation modes, operation modes within an operation cycle, the duration of an operating cycle, an operation criterion, or the like, or a combination thereof. As used herein, the operation cycle of a device may be a basic operating process of the device. The duration of an operation cycle may be a sum of the durations of the operation modes within the operation cycle of the device. Descriptions relating to an operation mode of a device may be found elsewhere in the present disclosure, e.g., in FIG. 1 and the description thereof, and are not repeated here.

Figure 5A:
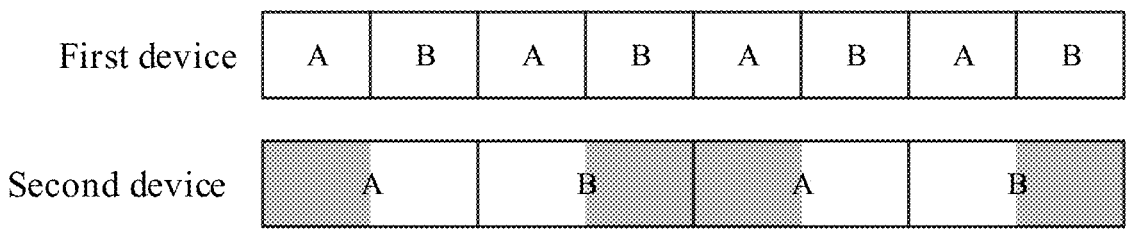
FIGS. 5A to 5C illustrate three schematic diagrams of operation modes of two connectable devices, a first device and a second device, according to some embodiments of the present disclosure.
Figure 5B:
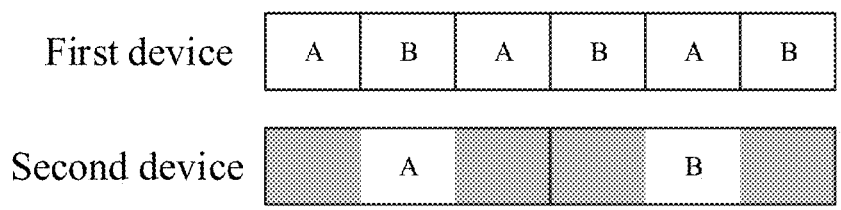
Figure 5C:
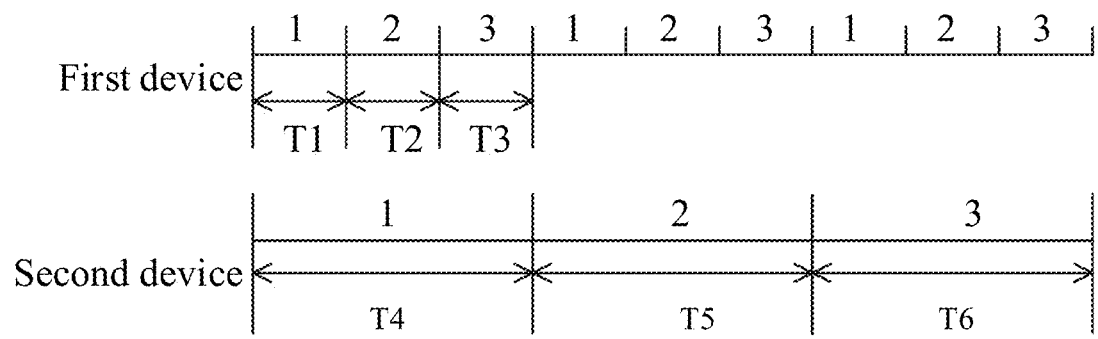

Merely by way of example, device 110 may be a first device as shown in FIG. 5C. The first device may have three operation modes, i.e., operation mode 1, operation mode 2, and operation mode 3. The durations of the three operation modes may be T1, T2, and T3, respectively. In an operation cycle, the first device may operate in operation mode 1, operation mode 2, and operation mode 3 successively. The duration of an operation cycle of the first device may be a sum of T1, T2, and T3. It should be noted that the above descriptions of operation mode of the first device are provided for the purposes of illustration, and not intended to limit the scope of the present disclosure.

Operation mode module 310 may determine the one or more parameters relating to one or more operation modes of a device based on calculation or user's input. For example, a user may input one or more parameters relating to one or more operation modes (e.g., the duration of an operation mode, an operation criterion, etc.). The input may be provided via a user interface element in computing device 200A illustrated in FIG. 2A or a mobile device 200B illustrated in FIG. 2B. As another example, operation mode module 310 may determine one or more parameters relating to one or more operation modes of device 130 based on one or more parameters relating to one or more operation modes of device 110. In some embodiments, the duration of an operation mode of device 130 may be greater than the duration of an operating cycle of device 110. As another example, operation mode module 310 may determine one or more parameters relating to one or more operation modes of device 130 based on a time needed for establishing a connection between device 110 and device 130. In some embodiments, the duration of an operation mode of device 110 may be equal to or greater than twice the time needed for establishing a connection between device 110 and device 130.

Control module 320 may control the operation mode of a device (e.g., device 110, device 130, etc.). Control module 320 may control the operation mode of the device based on one or more parameters relating to the operation mode of the device, a determination result generated by determination module 330, or an operational characteristic of the operation mode. The one or more parameters relating to the operation mode of the device may be determined by operation mode module 310. For example, control module 320 may switch the operation mode of device 110 based on the durations of operation modes and the sequence of operation modes of device 110. As another example, control module 320 may prevent device 110 from switching its operation modes if a determination result is generated by determination module 330 indicating that a connection between device 110 and device 130 is established. As another example, control module 320 may switch the operation modes of device 110 based on the data transmission speeds of operation modes in a descending order.

Determination module 330 may make one or more determinations relating to system 100 of connectable devices. The one or more determinations may include a determination as to whether a connection between multiple devices can be established, a determination as to whether an operation mode of a device needs to be switched, a determination as to whether an operation criterion of a device is satisfied, or the like, or a combination thereof. The one or more determinations may be made based on one or more data analysis technologies. Exemplary data analysis technologies may include data comparison, data sequencing, data calculation (e.g., summation, etc.), or the like, or a combination thereof. In some embodiments, determination module 330 may determine whether the operation mode of a device needs to be switched based on the result of a timing generated by timing module 350.

Connection module 340 may establish a connection between multiple devices. The connection between multiple devices may include a data connection between multiple devices. The multiple devices may communicate with each other once the connection is established. Merely by way of example with reference to device 110, connection module 340 may send data to other devices, receive, parse, and/or analyze data from other devices, respond to other devices, or perform other similar operations. In some embodiments, connection module 340 may establish a connection between multiple devices based on a determination result generated by determination module 330. The connection may be established only when the determination result indicates that the connection can be established.

Timing module 350 may count and/or record time. The time may include the duration of an operation mode of a device, the amount of time needed for establishing a connection between multiple devices, or the like, or a combination thereof. Merely by way of example, when device 110 switches its operation mode to A, timing module 350 may start timing the duration that device 110 operates in operation mode A.

It should be noted that the above descriptions of the connectable device in system 100 are provided for the purposes of illustration, and not intended to limit the scope of the present disclosure. For persons having ordinary skills in the art, various modifications and changes in the forms and details of the application of the above method and system may occur without departing from the principles in the present disclosure. However, those variations and modifications also fall within the scope of the present disclosure. For example, device 110 may include one or more other modules (e.g., a storage module to store data generated by the above modules). As another example, one module may perform the functions of two or more modules described above. In some embodiments, operation mode module 310 and control module 320 may form a module to define, set and/or switch an operation mode of a device.

Figure 4:
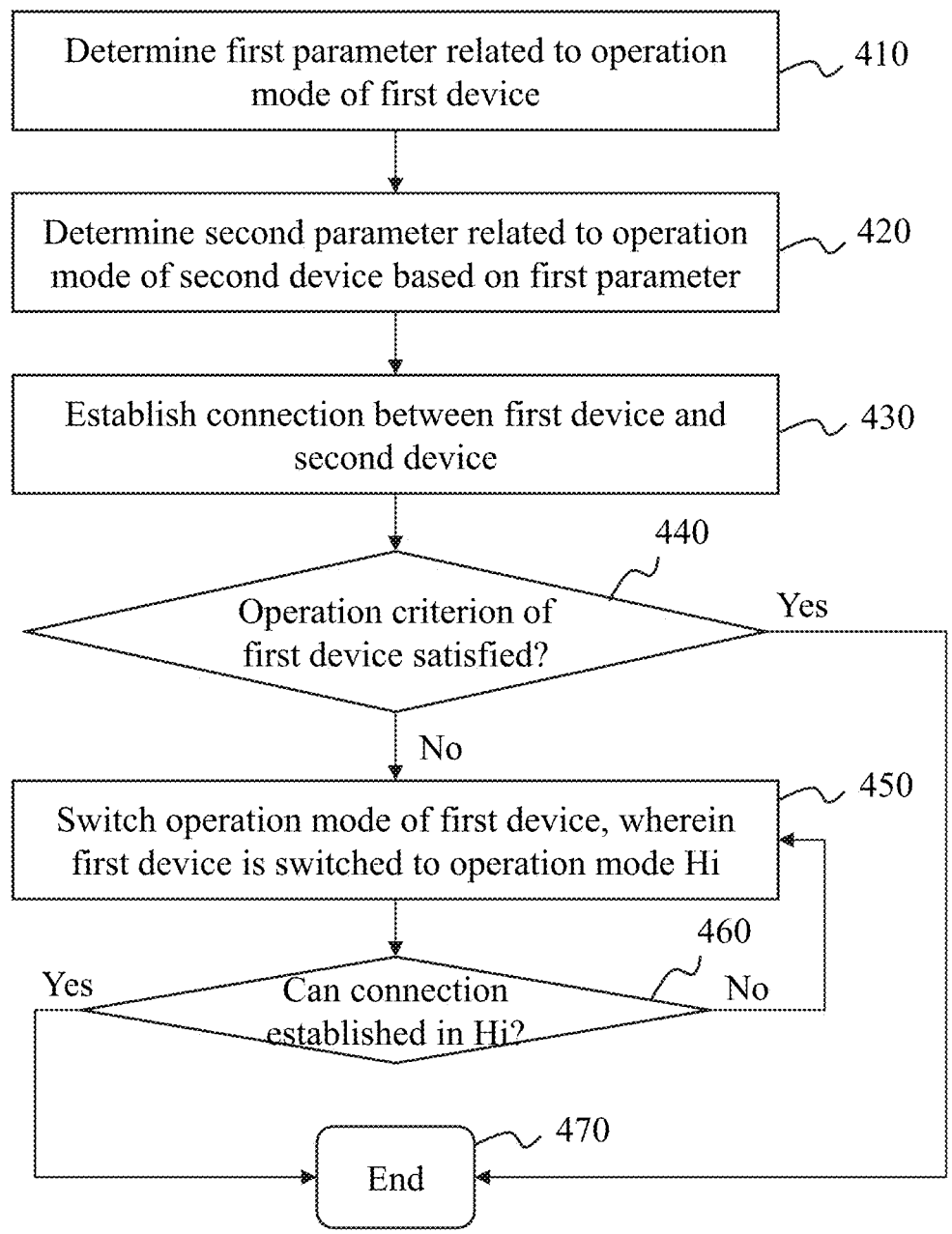
FIG. 4 is a flowchart illustrating an exemplary process for device connection according to some embodiments of the present disclosure.

FIG. 4 is a flowchart illustrating an exemplary process for device connection according to some embodiments of the present disclosure. In some embodiments, process 400 may be performed by one or more components of device 110 and/or device 130 (shown in FIG. 3). In some embodiments, at least part of process 400 may be performed by computing device 200A shown in FIG. 2A.

For illustration purposes, process 400 may be implemented on a first device and a second device. The first device and the second device may be any device in system 100. For example, the first device may be device 110 and the second device may be device 130, or the first device may be device 130 and the second device may be device 110. The first device and the second device may respectively operate in one or more operation modes. In some embodiments, the first device and the second device may have at least one same operation mode. In some embodiments, the first device may be an IP camera and the second device may be a storage device. In some embodiments, the second device may be an IP camera and the first device may be a storage device.

In 410, one or more first parameters relating to one or more operation modes of a first device may be determined. The one or more first parameters may include the duration of an operation mode, a sequence of the one or more operation modes, operation modes within an operation cycle, the duration of an operation cycle, or the like, or a combination thereof. The duration of each operation mode within an operation cycle may be the same or different. The sequence of the one or more operation modes within an operation cycle may be random or determined based on one or more operational characteristics (e.g., data transmission speed of each operation mode, etc.). The duration of an operation mode of the first device may be equal to or longer than a time needed for establishing a connection between the first device and the second device in the operation mode. In some embodiments, the duration of an operation mode of the first device may be equal to or greater than twice a time needed for establishing a connection between the first device and the second device in the operation mode. In some embodiments, 410 may be performed by operation mode module 310. Descriptions of the parameter determination relating to the operation mode of a device may be found elsewhere in the present disclosure, e.g., FIG. 3 the description thereof, and are not repeated here.

In 420, one or more second parameters relating to one or more operation modes of a second device may be determined based the one or more first parameters relating to one or more operation modes of the first device. The determination of the one or more second parameters may be substantially similar to the determination of the one or more first parameters and are not repeated. The one or more second parameters may include, for example, the duration of an operation mode of the second device. The duration of an operation mode of the second device may be equal to or greater than the duration of an operation cycle of the first device. In some embodiments, 420 may be performed by operation mode module 310.

FIGS. 5A to 5C illustrate three schematic diagrams of operation modes of two connectable devices, a first device and a second device according to some embodiments of the present disclosure. As shown in FIGS. 5A and 5B, the first device and the second device each have two operation modes, i.e., operation mode A and operation mode B. In an operation cycle, the first device and the second device operate first in operation mode A and then in operation mode B. As shown in FIG. 5A, the durations of operation mode A and operation mode B of the second device each are equal to a sum of the durations of operation mode A and operation mode B of the first device. The duration of operation mode A and B of the first device may both be T, and the durations of operation modes A and B of the second device may both be 2T.

In the example shown in FIG. 5B, the duration of operation mode A of the second device is equal to a sum of the duration of operation mode B and twice the duration of operation mode A of the first device. The duration of operation mode B of the second device is equal to a sum of the duration of operation mode A and twice the duration of operation mode B of the first device.

In the example shown in FIG. 5C, the first device and the second device each have three operation modes, i.e., operation mode 1, operation mode 2, and operation mode 3. The durations of the three operation modes of the first device are T1, T2, and T3, respectively. The durations of the three operation modes of the second device are T4, T5, and T6, respectively. T4, T5, and T6 are equal to or greater than a sum of T1, T2, and T3. It should be noted that the above examples illustrated in FIGS. 5A to 5C are provided for the purposes of illustration, and not intended to limit the scope of the present disclosure. The first device and the second device may have any number of operation modes and the operation modes may be arranged in any sequence.

In 430, a connection between the first device and the second device may be established. The connection between the two devices may include a data connection. To establish a connection between the first device and the second device, at least one of the two devices may switch its operation mode based on the one or more parameters relating to its operation mode determined in operations 410 and 420. In some embodiments, 430 may be performed by connection module 340. More descriptions regarding the establishment of the connection between the first device and the second device may be found elsewhere in the present disclosure. See, e.g., FIGS. 6A and 6B and the relevant descriptions.

In some embodiments, the connection between the first device and the second device may be established only when the operation modes of the two devices match. In some embodiments, the operation modes of the two devices may match when they are the same. As shown in FIGS. 5A to 5B, the grey areas show the portions during which the first device and the second device operate in a same operation mode. The first device and the second device may be connected to each other in any one of the grey areas.

In 440, a judgment may be made as to whether an operation criterion of the first device is satisfied. In some embodiments, the operation criterion may be determined by operation mode module 310 based on a user demand, the network status, etc. The operation criterion may relate to an operational characteristic of an operation mode of the first device. Exemplary operational characteristics may include data transmission speed, data transmission distance, bandwidth, or the like, or any combination thereof.

For example, the operation criterion may be that the data transmission distance of the operation mode of the first device is within a certain range. As another example, the operation criterion may be that the data transmission speed of the operation mode of the first device exceeds a threshold. In some embodiments, the threshold may be determined by the highest data transmission speed of all operation modes of the first device. For example, the threshold may equal to or be slightly smaller than the highest data transmission speed of all operation modes of the first device. As used herein, "slightly smaller than" may indicate that threshold is at least 70%, 80%, 90%, or 95% of the highest data transmission speed of all operation modes of the first device. In that way, the first device may operate in the highest data transmission speed of its own operation modes by way of implementing process 400. In some embodiments, 440 may be performed by determination module 330. If the operation criterion of the first device is satisfied, 470 may be performed. Otherwise, 450 may be performed.

In 450, the operation mode of the first device may switch to $H_i$, in which i refers to the number of times that operation 450 is performed. The operation mode $H_i$ may be the operation mode with the $i^{th}$ data transmission speed among all operation modes of the first device. For example, when operation 450 is performed for the first time, operation mode $H_1$ may be the operation mode with the highest data transmission speed among all operation modes of the first device. When operation 450 is performed for the second time, operation mode $H_2$ may be the operation mode with the second data transmission speed among all operation modes of the first device. In some embodiments, 450 may be performed under control of control module 320.

Merely by way of example, the first device and the second device operate in operation mode L after operation 430. In some embodiments, the operation mode L may have the highest data transmission speed among all operation modes of the first device. In that case, the maximum number of i (i.e., the most time that 450 may be performed) may be equal to the number of operation modes of the first device. In some embodiments, the operation mode L does not have the highest data transmission speed among all operation modes of the first device. In that case, operation mode Hi may be an operation mode whose data transmission speed is equal to or greater than operation mode L. The maximum number of i may be smaller than the number of operation modes of the first device.

In 460, a judgment may be made as to whether a connection between the first device and the second device may be established during operation mode $H_1$ of the first device. The duration of operation mode $H_1$ of the first device may be determined in operation 410. In the duration of operation mode $H_1$, the connection between the first device and the second device may be established if the second device also operate in $H_1$. In some embodiments, if the connection between the first device and the second device is established in the duration of operation mode $H_1$ of the first device, 470 may be performed. Otherwise, 450 may be performed again until the connection between the two devices is established. In some embodiments, 460 may be performed by determination module 330. In some embodiments, if the connection is established, process 400 may proceed to 440 to check whether an operation criterion of the first device is satisfied.

In 470, process 400 may be ended. The first device and the second device may stop switching their operation modes and operate in the operation mode when the connection is established.

It should be noted that the above descriptions of process 400 are provided for the purposes of illustration, and not intended to limit the scope of the present disclosure. For persons having ordinary skills in the art, various modifications and changes in the forms and details of the application of the above method and system may occur without departing from the principles in the present disclosure. However, those variations and modifications also fall within the scope of the present disclosure. For example, one or more operations may be added or omitted. In some embodiments, operations 440 to 470 may be omitted.

Figure 6A:
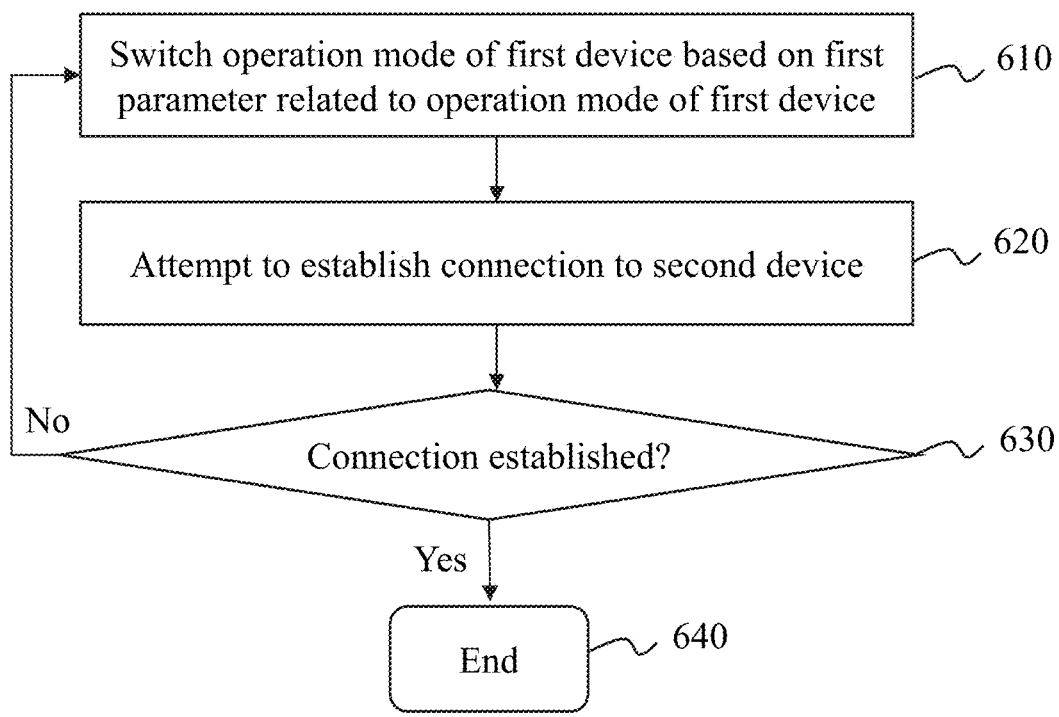
FIG. 6A is a flowchart illustrating an exemplary process for establishing a connection between a first device and a second device according to some embodiments of the present disclosure.

FIG. 6A is a flowchart illustrating an exemplary process for establishing a connection between a first device and a second device according to some embodiments of the present disclosure. Process 600A described with reference to FIG. 6A may be an exemplary process for achieving 430 shown in FIG. 4. In some embodiments, process 600A may be performed by one or more components of device 110 and/or device 130 (shown in FIG. 3). Process 600A may be implemented on or performed by a first device. Descriptions relating to the first device may be found elsewhere in the present disclosure, e.g., FIG. 4 the description thereof, and are not repeated here.

In 610, a first device may switch its operation mode based on one or more first parameters relating to the operation mode of the first device. Descriptions of the one or more first parameters may be found elsewhere in the present disclosure, e.g., FIG. 4 the description thereof, and are not repeated here. The first device may switch its operation mode based on a sequence of its operation modes and a duration of each operation mode. For example, as shown in FIG. 5C, the first device may first switch its operation mode to operation mode 1. It may operate in operation mode 1 for T1 and may then switch its operation mode to operation mode 2. The operation mode 2 may last T2 and the first device may then switch its operation mode to operation mode 3. The operation mode 3 may last T3. Afterwards, a second operation cycle of the first device may begin. In some embodiments, 610 may be performed under the control of control module 320.

In 620, the first device may attempt to establish a connection to a second device. In some embodiments, once the first device switches its operation mode, it may begin sending data to a second device. In some embodiments, 620 may be performed by connection module 340.

In 630, a judgment may be made as to whether a connection between the first device and the second device may be established. In some embodiments, if the second device operates in a same operation mode as the first device, the connection may be established and 640 may be performed. Otherwise, the connection may not be established and 610 may be performed again until the connection is established or another condition is satisfied (e.g., after a certain number of failed connection attempts). In some embodiments, if the connection is established, the data sent from the first device may be received and parsed by the second device, and the first device may receive a response from the second device. In some embodiments, 630 may be performed by determination module 330.

In 640, process 600A may be ended and the first device may stop switching operation mode.

Figure 6B:
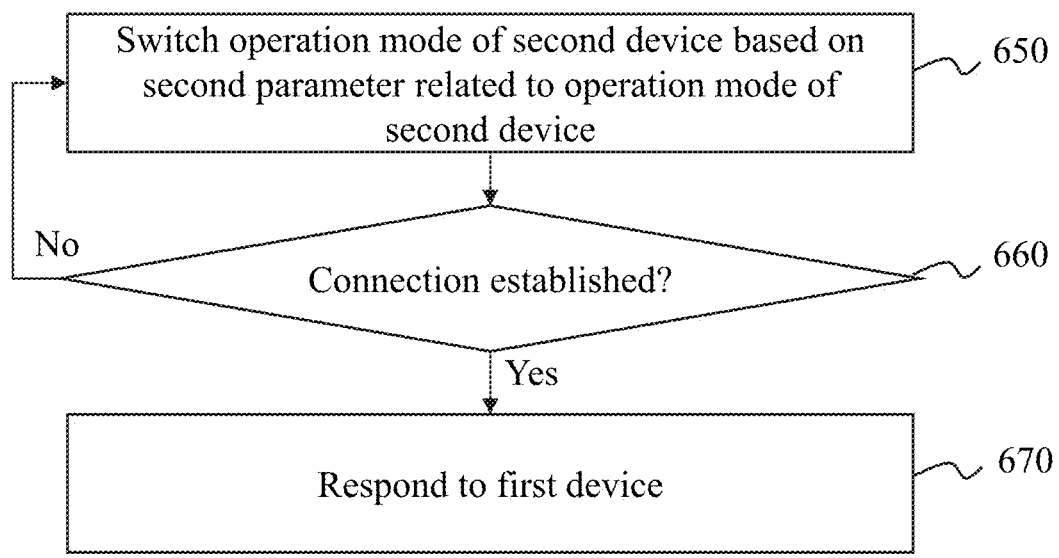
FIG. 6B is a flowchart illustrating an exemplary process for establishing a connection between a second device and a first device according to some embodiments of the present disclosure.

FIG. 6B is a flowchart illustrating an exemplary process for establishing a connection between a first device and a second device according to some embodiments of the present disclosure. Process 600B described with reference to FIG. 6B may be an exemplary process for achieving 430 shown in FIG. 4. In some embodiments, process 600B may be performed by one or more components of device 110 and/or device 130 (shown in FIG. 3). Process 600B may be implemented on a second device. Descriptions relating to the second device may be found elsewhere in the present disclosure, e.g., FIG. 4 the description thereof, and are not repeated here.

In 650, a second device may switch its operation mode based on one or more second parameters relating to the operation mode of the second device. In 660, a judgment may be made as to whether a connection between the first device and the second device may be established. If the connection is established, 670 may be performed. Otherwise, 650 may be performed again until the connection is established or another condition is satisfied (e.g., after a certain number of failed connection attempts). In 670, the second device may respond to the first device. Operations 650 and 660 may be substantially similar to operations 610 and 630, respectively, as described in FIG. 6A and are not repeated here.

In some embodiments, the first device may be an IP camera and the second device may be a storage device. The IP camera may begin sending data to the storage device once it switches its operation mode. If the storage device receives and parses the data, it may send a response back to the first device. In that case, the connection between the IP camera and the storage device may be established successfully.

It should be noted that the above descriptions of process 600A and 600B are provided for the purposes of illustration, and not intended to limit the scope of the present disclosure. For persons having ordinary skills in the art, various modifications and changes in the forms and details of the application of the above method and system may occur without departing from the principles in the present disclosure. However, those variations and modifications also fall within the scope of the present disclosure. For example, process 600A may be implemented on the second device and process 600B may be implemented on the first device. The second device may attempt to establish a connection and the first device may respond to the second device.

Figures 7A, 7B:
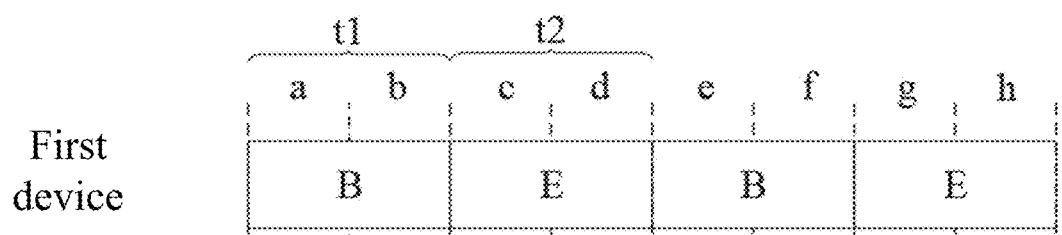
FIG. 7A illustrates a schematic diagram of operation modes of a first device according to some embodiments of the present disclosure.
FIG. 7B illustrates schematic diagrams of operation modes of a second device according to some embodiments of the present disclosure.

FIG. 7A illustrates a schematic diagram of operation modes of a first device according to some embodiments of the present disclosure. FIG. 7B illustrates a schematic diagram of operation modes of a second device according to some embodiments of the present disclosure. As exemplified, the first device and the second device each have two operation modes, i.e., operation mode B and operation mode E. The durations of operation mode B and operation mode E of the first device are $t_1$ and $t_2$, respectively. The $t_1$ may be equal to $t_2$. The $t_1$ may be equal to or greater than twice the time needed for establishing a connection between the first device and the second device when they operate in operation mode B. The $t_2$ may be equal to or greater than twice the time needed for establishing a connection between the first device and the second device when they operate in operation mode E. Time periods a to h in FIG. 7A may be timing units and may be equal to each other. Time periods a to h may be equal to or greater than the time needed for establishing a connection between the first device and the second device when they operate in operation mode B or operation mode E. The durations of operation mode B and operation mode E of the second device are $t_3$ and $t_4$, respectively. In some embodiments, both $t_3$ and $t_4$ may be equal to twice $t_1$.

To establish a connection between the first device and the second device, the operation modes of the two devices may need to be matched. In some embodiments, the operation modes of the two devices may match when they are the same. As shown in FIG. 7B, there may be different cases when the operation modes of the first device and the second device match. In case 1 as illustrated, the first device and the second device are both at the beginning of an operation cycle when they begin to attempt to establish a connection. In case 2 as illustrated, the second device may begin to operate earlier than the first device for $2n(t_1+t_2)+t_1/2$, wherein n may be any integer equal to or greater than 0. In case 3 as illustrated, the second device may begin to operate earlier than the first device for $2n(t_1+t_2)+t_1$. In case 4 as illustrated, the second device may begin to operate earlier than the first device for $2n(t_1+t_2)+3t_1/2$. In case 5 as illustrated, the second device may begin to operate earlier than the first device for $2n(t_1+t_2)+2t_1$. In case 6 as illustrated, the second device may begin to operate earlier than the first device for $2n(t_1+t_2)+2t_1+t_2/2$. In case 7 as illustrated, the second device may begin to operate earlier than the first device for $2n(t_1+t_2)+2t_1+t_2$. In case 8 as illustrated, the second device may begin to operate earlier than the first device for $2n(t_1+t_2)+2t_1+3t_2/2$.

The grey areas in FIG. 7B show the portions during which the first device and the second device operate in a same operation mode. In cases 1 to 4, the first timing unit when the first device and the second device operate in a same operation mode is a. In cases 5 and 6, the first timing unit when the first device and the second device operate in a same operation mode is c. In case 7, the first timing unit when the first device and the second device operate in a same operation mode is e. In case 8, the first timing unit when the first device and the second device operate in a same operation mode is b. Because each time unit is equal to or greater than the time needed for establishing a connection when the two devices operate in operation mode B or operation mode E, the connection between the two devices may be established in the corresponding first timing unit when the two devices operate in a same operation mode in each case. Once the connection is established, the first device and the second device may stop switching their operation modes.

Figure 8A:
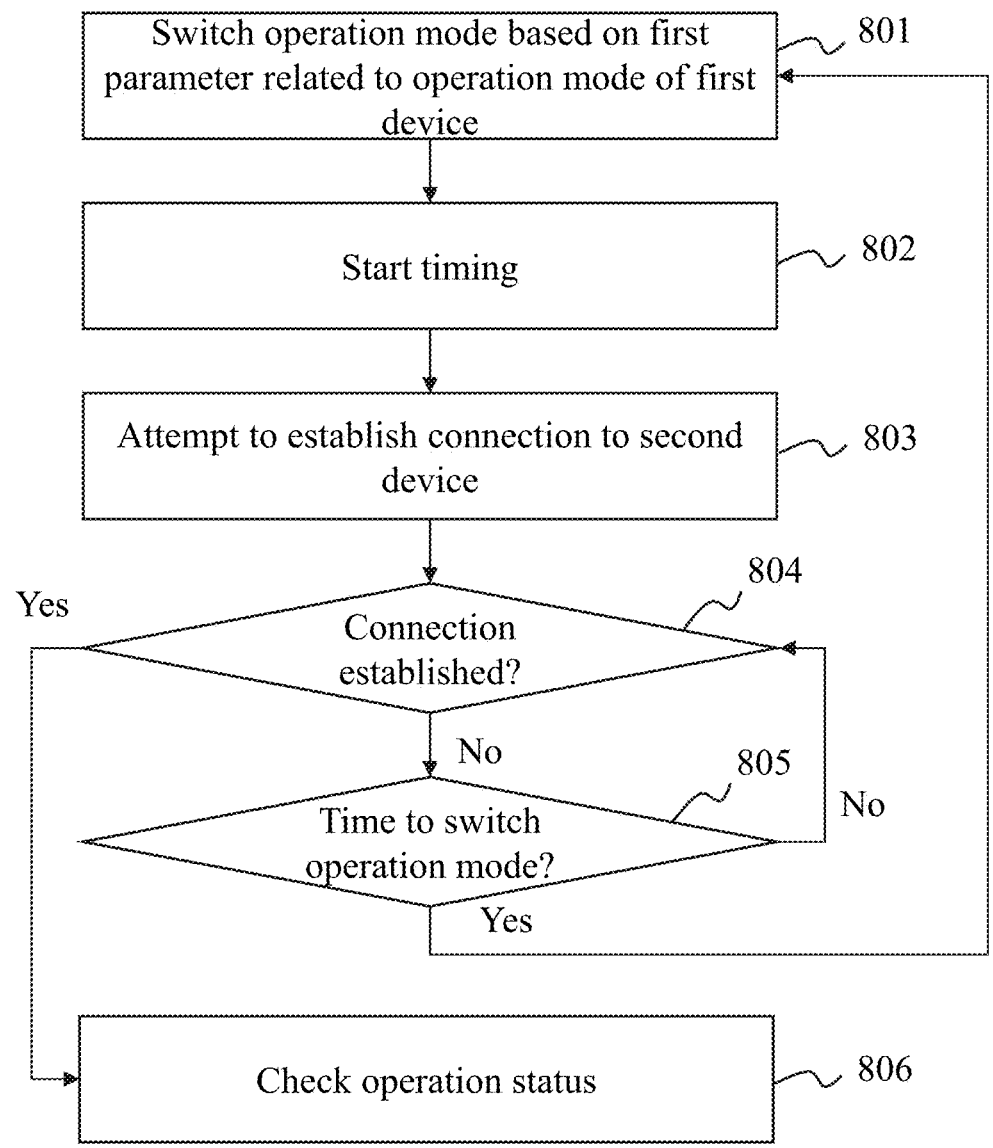
FIG. 8A is a flowchart illustrating an exemplary process for establishing a connection between a first device and a second device according to some embodiments of the present disclosure.
Figure 8B:
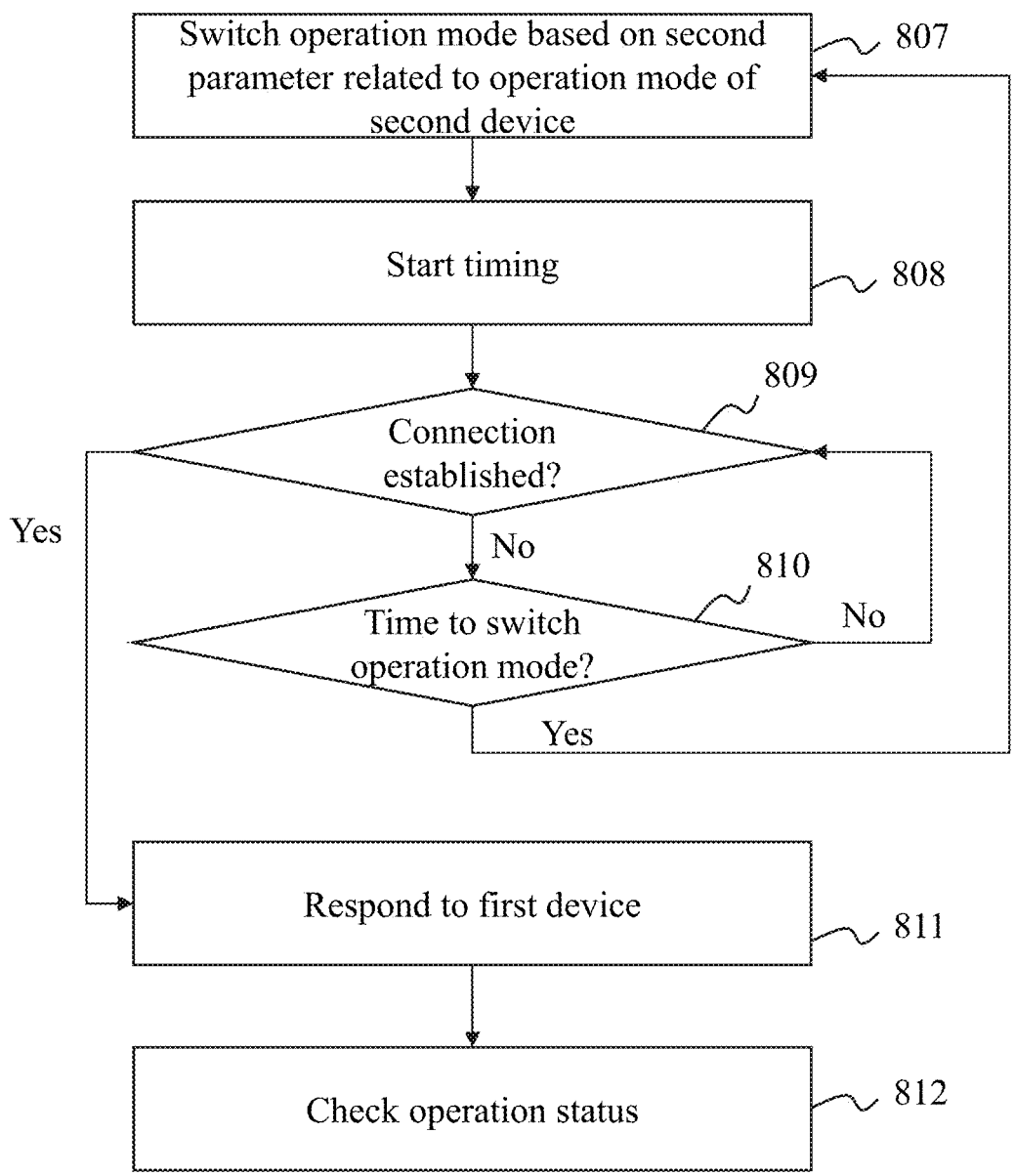
FIG. 8B is a flowchart illustrating an exemplary process for establishing a connection between a second device and a first device according to some embodiments of the present disclosure.

FIGS. 8A to 8B are flowcharts illustrating exemplary processes for establish a connection between a first device and a second device according to some embodiments of the present disclosure. The first device in FIGS. 8A and 8B may be similar to the first device with reference to FIG. 7A, and the second device in FIGS. 8A and 8B may be similar to the second device in case 1 with reference to FIG. 7B. Process 800A and process 800B may be exemplary embodiments of process 600A and process 600B, respectively, as described in FIGS. 6A and 6B.

In 801, a first device may switch its operation mode based on a first parameter relating to its operation mode. As shown in FIG. 7A, the first device may switch its operation mode to operation mode B first. In some embodiments, 801 may be performed under the control of control module 320.

In 802, once the first device switches its operation mode, timing module 350 may start timing the duration that the first device operates in that operation mode. The time may be denoted as T.

In 803, the first device may attempt to establish a connection to the second device. In 804, a judgment may be made as to whether the connection is established. If the connection is established, 806 may be performed. Otherwise, 805 may be performed. Operation 803 and operation 804 may be substantially similar to 620 and 630, respectively, as described in FIG. 6A and are not repeated here.

In 805, a judgment may be made as to whether it is time to switch the operation mode of the first device. In some embodiments, 805 may be performed by determination module 330. If T is less than the duration of the current operation mode of the first device, 804 may be performed again. Otherwise, 801 may be performed. The operation mode of the first device may be switched to E according to FIG. 7A. Operations 802 to 805 may be performed again until the connection between the first device and the second device is established, or another condition is satisfied (e.g., after a certain number of failed connection attempts).

In 806, an operation status of the first device may be checked to confirm that the first device is connected to the second device. Process 800A may be ended and the first device may stop switching operation mode.

As shown in FIG. 8B, in 807, the second device may switch its operation mode based on one or more second parameters relating to operation mode of the second device. The operation mode of the second device may be switched to B according to case 1 in FIG. 7B.

In 808, once the second device switches its operation mode, timing module 350 may start timing the duration that the second device operates in that operation mode. In 809, a judgment may be made as to whether a connection between the first device and the second device is established. If the connection is established, 811 may be performed. Otherwise, 810 may be performed. Operation 809 may be substantially similar to 660 as described in FIG. 6B and is not repeated here.

In 810, a judgment may be made as to whether it is time to switch the operation mode of the second device. If it is time to switch the operation mode, 807 may be performed. Otherwise, operation 809 may be performed again. Operation 810 may be substantially similar to 805 as described in FIG. 8A and is not repeated here.

In 811, the second device may respond to the connection attempt from the first device. In 812, an operation status of the second device may be checked to confirm that the second device is connected to the first device. Process 800B may be ended and the second device may stop switching its operation mode.

Figure 9:
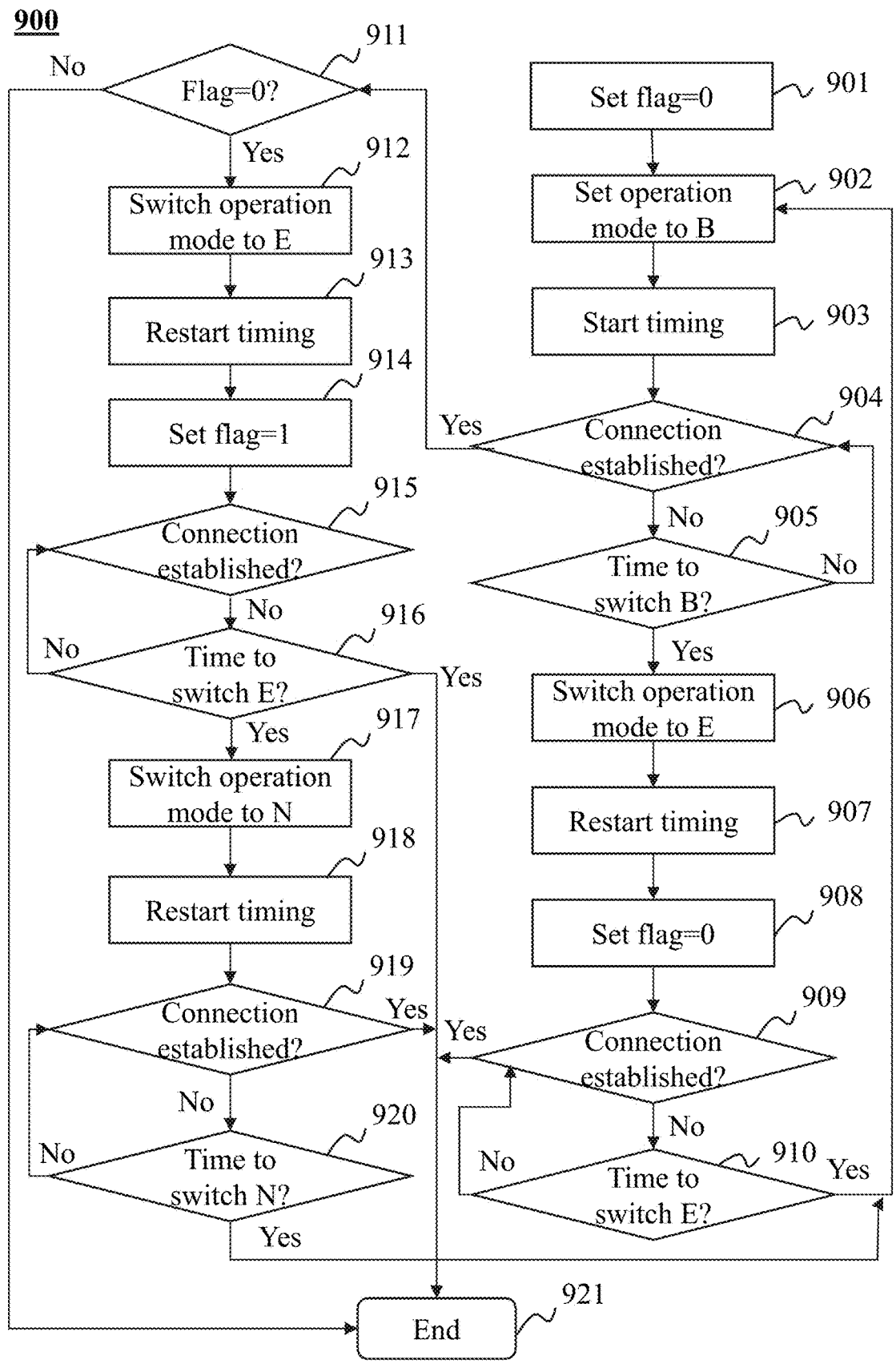
FIG. 9 is a flowchart illustrating an exemplary process for establishing a device connection according to some embodiments of the present disclosure.
Figure 10A:
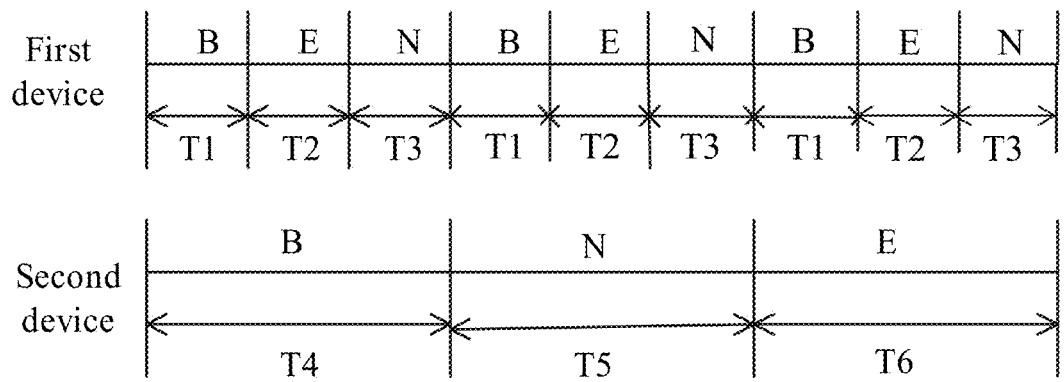
FIG. 10A illustrates diagrams of operation modes of a first device and a second device according to some embodiments of the present disclosure.

FIG. 9 is a flowchart illustrating an exemplary process for device connection according to some embodiments of the present disclosure. In some embodiments, process 900 may be performed by one or more components of device 110 and/or device 130 (shown in FIG. 3). Process 900 may be implemented on a first device and a second device as shown in FIG. 10A. The first device and the second device may each have three operation modes (e.g., operation mode B, operation mode E, and operation mode N). In each operation cycle of the first device, the first device may operate in operation modes B, E, and N, successively. The durations of operation modes B, E, and N of the first device may be T1, T2, and T3, respectively. In each operation cycle of the second device, the second device may operate in operation modes B, N, and E, successively. The durations of operation modes B, N, and E of the second device may be T4, T5, and T6, respectively. Merely by way of example, T4, T5, and/or T6 each may be equal to the sum of T1, T2, and T3.

Merely by way of example, the data transmission speed of operation mode B may be the lowest among the operation modes B, N, and E, and the data transmission speed of operation mode E may be the highest among the three operation modes. The possibility for the first device and the second device to establish a connection may be the highest among the operation modes B, N, and E when they operate in operation mode B. In some embodiments, operation mode E may be a universal or a standard operation mode for the first device or the second device.

In 901, a flag may be set to zero, indicating that the first device has not operated in operation mode B.

In 902, the first device may be set to operation mode B. In some embodiments, 902 may be performed under the control of control module 320. Once the operation mode of the first device is set, in 902, timing module 350 may start timing the duration that the first device operates in that operation mode.

In 904, a judgment may be made as to whether a connection between the first device and the second device may be established. If the second device operates in operation mode B, the connection may be established and 911 may be performed. Otherwise, the connection may not be established and 905 may be performed. In some embodiments, 904 may be performed by determination module 330. In some embodiments, once the first device switches to operation mode B in 902, the first device may start sending data to the second device. That the second device receives the data may indicate that the first device and the second device are successfully connected.

In 905, a judgment may be made as to whether it is time to switch the operation mode of the first device to operation mode B. If the duration of the first device in operation mode B determined by timing module 350 is smaller than T1, 904 may be performed again. Otherwise, 906 may be performed. In some embodiments, 904 may be performed by determination module 330.

In 906, the operation mode of the first device may be switched to E. In some embodiments, 906 may be performed under the control of control module 320. Once the operation mode of the first device is switched to E, in 907, timing module 350 may restart timing the duration that the first device operates in that operation mode.

In 908, the flag may be set to zero again. Because the first device and the second device are not connected successfully when they operate in operation mode B, the flag is set to zero.

In 909, a judgment may be made as to whether a connection between the first device and the second device may be established. If the second device operates in operation mode E, the connection may be established and 921 may be performed. Otherwise, the connection may not be established and 910 may be performed. In some embodiments, 909 may be performed by determination module 330.

In 910, a judgment may be made as to whether it is time to switch the operation mode of the first device to operation mode E. If the duration of the first device in operation mode E determined by timing module 350 is smaller than T2, 909 may be performed again. Otherwise, 902 may be performed. In some embodiments, 910 may be performed by determination module 330.

In 911, a judgment may be made as to whether the flag is equal to zero. If the flag is equal to zero, 912 may be performed. Otherwise, 921 may be performed. As described above, only when a connection is established when the first device and the second device operate in operation mode B in 904, 911 may be performed. Because the data transmission speed of operation mode B is the lowest among operation modes B, N, and E, the first device and the second device may try to establish a connection in an operation mode with a higher data transmission speed. Therefore, the operation mode of the first device may be switched to E in 912. In some embodiments, 912 may be performed under the control by control module 320. Once the operation mode of the first device is switched to E, in 913, timing module 350 may restart timing the duration that the first device operates in that operation mode.

In 914, the flag may be set to one, indicating that the first device and the second device are connected successfully when they operate in operation mode B.

In 915, a judgment may be made as to whether a connection between the first device and the second device may be established. If the second device operates in operation mode E, the connection may be established and 921 may be performed. Otherwise, the connection may not be established and 916 may be performed. In some embodiments, 915 may be performed by determination module 330.

In 916, a judgment may be made as to whether it is time to switch operation mode E. If the operating time of the first device in operation mode E determined by timing module 350 is smaller than T2, 915 may be performed again. Otherwise, 917 may be performed. Because the first device and the second device may not establish a connection in operation E with the highest data transmission speed, the two devices may try to establish a connection in an operation mode with a second highest data transmission speed. Therefore, the operation mode of the first device may be switched to N in 917.

In some embodiments, 916 may be performed by determination module 330 and 917 may be performed under the control of control module 320. Once the operation mode of the first device is switched to N, in 918, timing module 350 may restart timing the duration that the first device operates in that operation mode.

In 919, a judgment may be made as to whether a connection between the first device and the second device may be established. If the second device operates in operation mode N, the connection may be established and 921 may be performed. Otherwise, the connection may not be established and 920 may be performed. In some embodiments, 919 may be performed by determination module 330.

In 920, a judgment may be made as to whether it is time to switch operation mode N. If the operating time of the first device in operation mode E determined by timing module 350 is smaller than T3, 919 may be performed again. Otherwise, 902 may be performed. In some embodiments, 920 may be performed by determination module 330. If the first device and the second device cannot establish a connection in both of operation mode E and operation mode N, the two devices may try to establish a connection in operation mode B again.

In 921, process 900 may be ended and the first device and second device may stop switching their operation modes. The first device and the second device may continue operating in the operation mode when the connection is established.

Figure 10B:
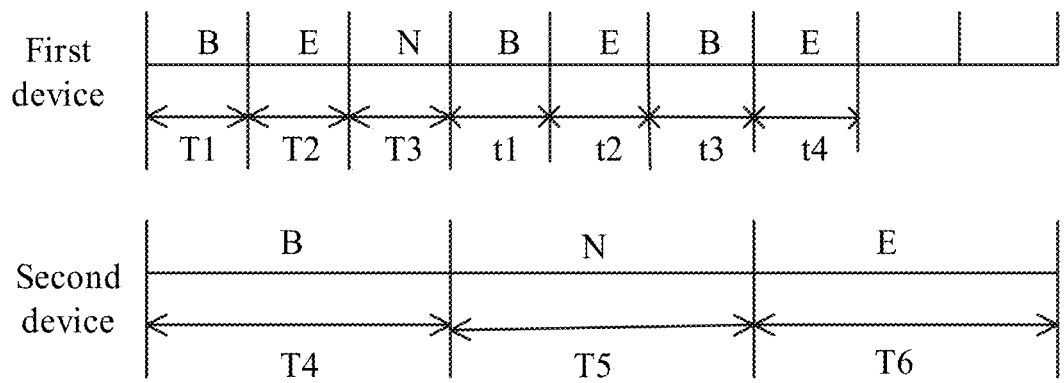
FIG. 10B illustrates schematic diagrams of matching operation modes of a first device and the second according to some embodiments of the present disclosure.

FIG. 10B illustrates a schematic diagram of matching operation modes of a first device and the second according to some embodiments of the present disclosure. The first device and the second device may correspond to the first device and the second device as described in FIG. 10A. In some embodiments, the operation modes of the first device and the second device may be matched by the way of process 900 as described in FIG. 9.

As shown in FIG. 10B, the first device and the second device operate in operation mode B in T1 so the two devices can be connected. Operation 911 is then be performed and the operation mode of the first device is switched to E. The flag is set to one. The first device and the second device cannot be connected in T2 and the operation mode of the first device is switched to N. Because the first device and the second device cannot be connected in T3, 902 is then performed again and the operation mode of the first device is switched to B again. During t1 and t2, the first device and the second device do not operate in a same operation mode, and so 903 to 910 are performed. The first device is then switched to B for the third time. In t3, the connection still cannot be established, and so the operation mode of the first device is switched to E. In t4, the two devices operate in a same operation mode, and the connection can be established. The two devices are then connected to each other and stop switching operation modes.

Figure 11:
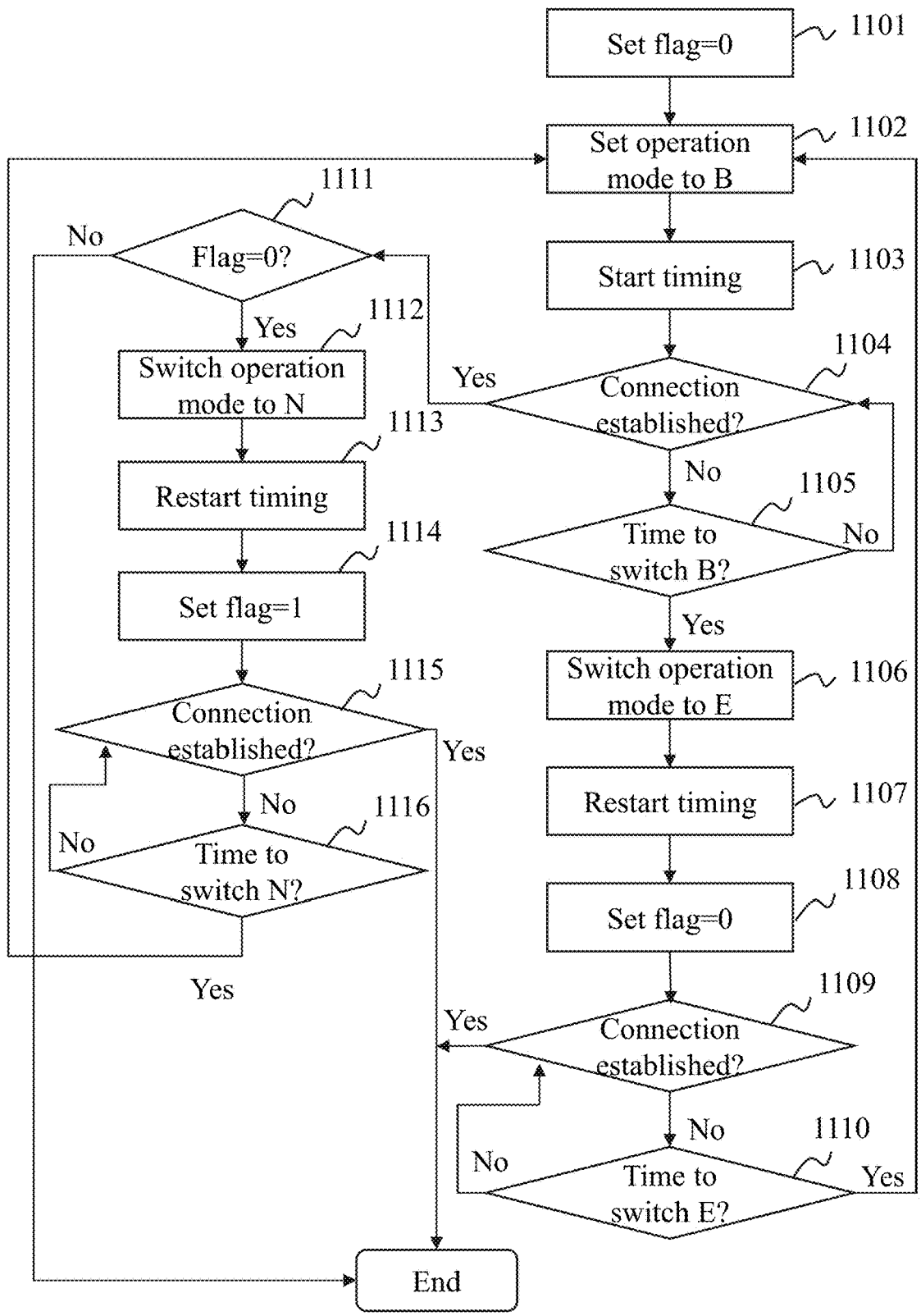
FIG. 11 is a flowchart illustrating an exemplary process for establishing a device connection according to some embodiments of the present disclosure.

FIG. 11 is a flowchart illustrating an exemplary process for device connection according to some embodiments of the present disclosure. Process 1100 may be an exemplary embodiment of process 900 as described in FIG. 9. Process 1100 may be substantially similar to process 900 except that the data transmission speed of operation mode N may be the same as that of operation mode E. Therefore, it makes no difference that the connection is established when the first device and the second device operate in operation mode N or operation mode E.

Operations 1101 to 1111 may be substantially similar to 901 to 911, respectively, as described in FIG. 9 and are not repeated here. In 1112, the operation mode of the first device may be switched to N. Once 1112 is performed, in 1113, timing module 350 may restart timing the duration that the first device operates in that operation mode. Operations 1115 and 1116 may be substantially similar to 919 and 920, respectively, as described in FIG. 9 and are not repeated here.

It should be noted that the above descriptions of process 900 and/or 1100 are provided for the purposes of illustration, and not intended to limit the scope of the present disclosure. For persons having ordinary skills in the art, various modifications and changes in the forms and details of the application of the above method and system may occur without departing from the principles in the present disclosure. However, those variations and modifications also fall within the scope of the present disclosure. In some embodiments, one or more operations may be added or omitted. In some embodiments, the order of two or more operations may be changed. For example, 901 and 902 may be performed at the same time. As another example, 908 may be performed before 906. In some embodiments, process 900 and/or process 1100 may be implemented on other devices whose operation modes are different than those of the first device and the second device as described in FIG. 10A.

Figure 12:
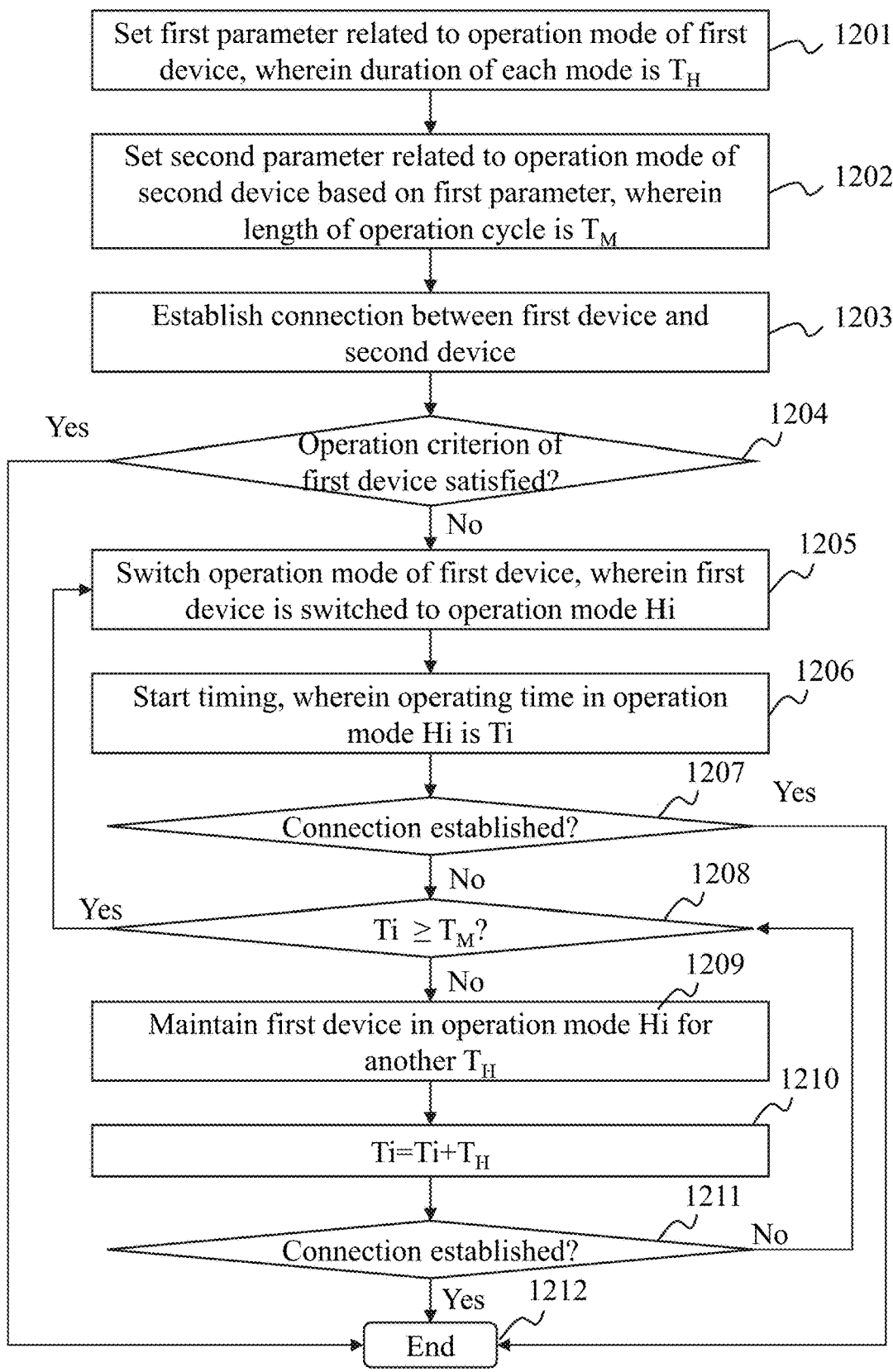
FIG. 12 is a flowchart illustrating an exemplary process for establishing a device connection according to some embodiments of the present disclosure.

FIG. 12 is a flowchart illustrating an exemplary process for device connection according to some embodiments of the present disclosure. In some embodiments, process 1200 may be performed by one or more components of device 110 and/or device 130 (shown in FIG. 3). Process 1200 may be implemented on a first device and a second device. The first device may be substantially similar to the first device as described in FIG. 4 except that the duration of each operation mode may be the same. The second device may be substantially similar to the second device as described in FIG. 4.

In 1201, one or more first parameters relating to one or more operation modes of the first device may be determined. The duration of each operation mode of the first device may be the same, denoted as $T_H$.

In 1202, one or more second parameters relating to one or more operation modes of the second device may be determined based on the one or more first parameters relating to one or more operation modes of the first device. The duration of an operation cycle of the second device may be denoted as $T_M$.

In 1203, a connection between the first device and the second device may be performed. The connection may be established when the two devices operate in a same operation mode. In 1204, a judgment may be made as to whether an operation criterion of the first device may be satisfied. The operation criterion may relate to the data transmission speed in the operation mode of the first device. If the operation criterion of the first device is satisfied, 1212 may be performed. Otherwise, 1205 may be performed.

In 1205, the operation mode of the first device may be switched to $H_1$, where i refers to the number of times that 1205 is performed. The operation mode $H_1$ may be the operation mode with the $i^{th}$ data transmission speed among all operation modes of the first device. The first device may operate in $H_i$ for $T_H$. Operations 1201 to 1205 may be substantially similar to 410 to 450 as described in FIG. 4, respectively, and are not repeated here.

In 1206, once the first device switches its operation mode, timing module 350 may start timing the duration that the first device operates in that operation mode. The operating time of the first device in operation mode $H_i$ may be denoted as $T_i$.

In 1207, a judgment may be made as to whether a connection between the first device and the second device may be established in the duration of operation mode $H_i$ (i.e., $T_H$). The connection may be established when the two devices operate in a same operation mode. In some embodiments, if the connection is established, 1212 may be performed; otherwise, 1208 may be performed. In some embodiments, if the connection is established, process 1200 may proceed to 1204 to check whether an operation criterion of the first device is satisfied.

In 1208, a judgment may be made as to whether $T_i$ is equal to or greater than $T_M$ (i.e., the length of operation cycle of the second device). If $T_i$ is equal to or greater than $T_M$ $T_M$, 1205 may be performed again. Otherwise, 1209 may be performed.

In 1209, the first device may operate in operation mode $H_i$ for another $T_H$. In 1210, the value of $T_i$ may be set to $T_i$ plus $T_H$. In 1211, a judgment may be made as to whether a connection between the first device and the second device may be established in another $T_H$. The connection may be established when the two devices operate in a same operation mode. In some embodiments, if the connection is established, 1212 may be performed; otherwise, 1208 may be performed. In some embodiments, if the connection is established, process 1200 may proceed to 1204 to check whether an operation criterion of the first device is satisfied.

In 1212, process 1200 may be ended and the first device and second device may stop switching their operation modes. The first device and the second device may keep operating in the operation mode when the connection is established.

Figure 13:
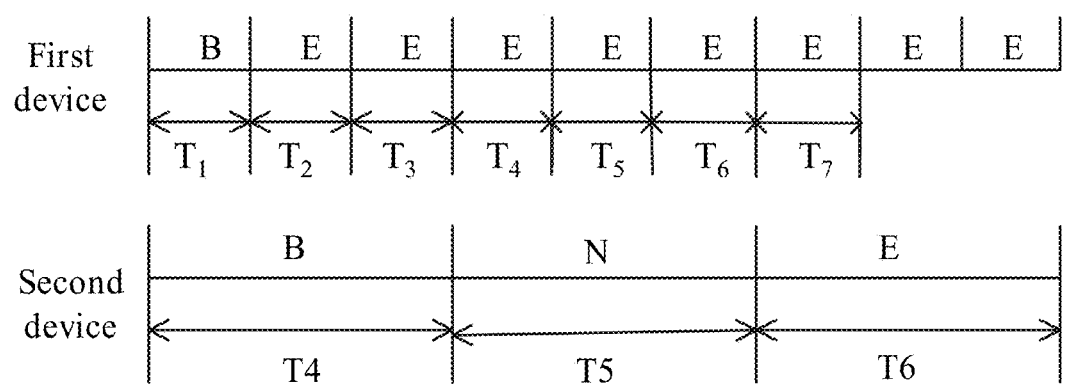
FIG. 13 illustrates a schematic diagram of matching operation modes of a first device and the second according to some embodiments of the present disclosure.

FIG. 13 illustrates a schematic diagram of matching operation modes of a first device and the second according to some embodiments of the present disclosure. The first device and the second device may be similar to the first device and the second device as described in FIG. 10A except that the duration of each of operation modes B, E, and N of the first device may be $T_H$. The operation modes of the first device and the second device may be matched.

As shown in FIG. 13, time periods $T_1$ to $T_7$ are each equal to $T_H$. The first device operates in operation modes B, E, E, E, E, E, and E in time periods $T_1$ to $T_7$, respectively. The second device operates in operation modes B, N, and E in time periods $T_4$ to $T_6$, respectively. The time periods $T_4$ to $T_6$ are each equal to the sum of three times of $T_H$. Both the first device and the second device operate in operation mode B in $T_1$, and so the two devices can be connected. The data transmission speed of operation mode B is the lowest among operation modes B, E, and N. In some embodiments, the operation criterion is that the data transmission speed of the first device is equal to or greater than a threshold. Merely by way of example, the threshold is greater than the data transmission speed of operation mode B. In that case, 1205 is then performed. The operation mode of the first device is switched to the operation mode E with the highest data transmission speed among operation modes B, E, and N. The duration of operation mode E is $T_H$, and so the first device operates in operation mode E in $T_2$. The second device operates in operation mode B in $T_2$, and therefore a connection cannot be established between the first device and the second device. The duration of the first device in operation mode E in $T_3$ to $T_6$ is less than the duration of an operation cycle the second device, and so the first device always operates in operation mode E. In $T_7$, the connection between the first device and the second device may be established because both devices operate in operation mode E. The two devices stop switch operation mode and continue operating in operation mode E.

Figure 14:
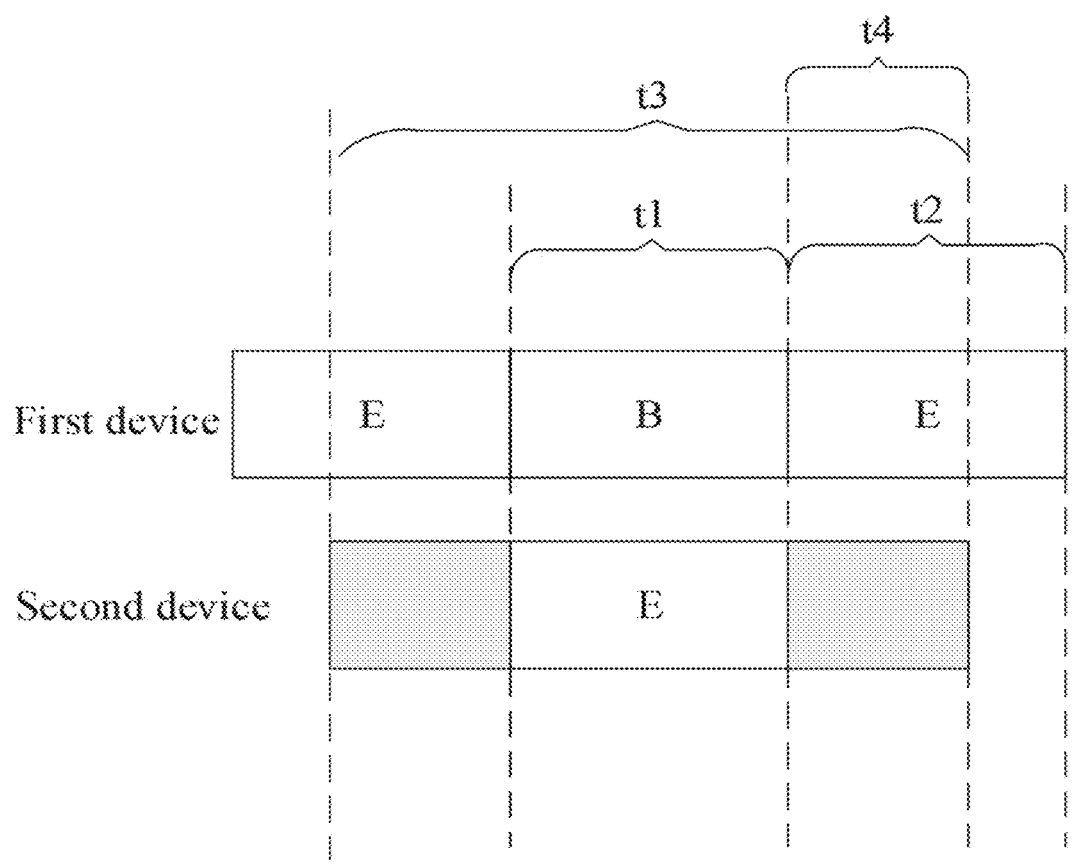
FIG. 14 illustrates a schematic diagram of the timing for establishing a connection between a first device and a second device according to some embodiments of the present disclosure.

FIG. 14 illustrates a schematic diagram of the timing for establishing a connection between a first device and a second device according to some embodiments of the present disclosure. Both the first device and the second device may have two operation modes, i.e., operation mode B and operation mode E. The durations of operation modes B and E of the first device may be t1 and t2. The t1 and t2 may be the same or different. The duration of operation mode E of the second device may be t3. The t3 may be equal to or greater than the sum of t1 and t2.

As shown in FIG. 14, a middle point of the duration of operation mode B of the first device may correspond to a middle point of the duration of operation mode E of the second device. The operation mode of the first device and the operation mode of the second device may match during t4. The t4 may be equal to (t3−t1)/2. The time needed for establishing a connection between the first device and the second device may be equal to or greater than t4 so that the connection can be established when the two devices operate in operation mode E.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the operator's computer, partly on the operator's computer, as a stand-alone software package, partly on the operator's computer and partly on a remote computer or entirely on the remote computer or server. In the latter scenario, the remote computer may be connected to the operator's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system, comprising:
   at least one processor;
   at least one non-transitory computer-readable storage medium storing a set of instructions, the set of instructions, when executed by the at least one processor, cause the system to:
   determine one or more first parameters relating to a first device, the first device having a first operation mode and a second operation mode, the one or more first parameters relating to the first device including a duration of the first operation mode and a duration of the second operation mode;
   determine one or more second parameters relating to a second device, the second device having a third operation mode, the one or more second parameters relating to the second device including a duration of the third operation mode, the duration of the third operation mode of the second device being greater than a sum of the duration of the first operation mode and the duration of the second operation mode of the first device; and
   establish a first connection between the first device and the second device based on the determined one or more first parameters relating to the first device and the determined one or more second parameters relating to the second device.

2. The system of claim 1, wherein to establish the first connection between the first device and the second device, the system is further caused to:
   switch an operation mode of the first device to the first operation mode;
   operate the second device in the third operation mode;
   determine that the first operation mode of the first device matches the third operation mode of the second device; and
   establish, in response to the determination that the first operation mode of the first device matches the third operation mode of the second device, the first connection between the first device and the second device.

3. The system of claim 2, wherein the first operation mode of the first device matches the third operation mode of the second device includes that the first operation mode of the first device is the same as the third operation mode of the second device.

4. The system of claim 2, wherein to establish the first connection between the first device and the second device, the system is further caused to:
   determine that the first operation mode of the first device does not match the third operation mode of the second device; and
   switch, in response to the determination that the first operation mode of the first device does not match the third operation mode of the second device, the operation mode of the first device from the first operation mode to the second operation mode based on the one or more first parameters relating to the first device.

5. The system of claim 4, wherein the first device further has a fifth operation mode, and the one or more first parameters relating to the first device further includes a duration of the fifth operation mode of the first device, and wherein:
   the duration of the third operation mode of the second device is greater than a sum of the duration of the first operation mode, the duration of the second operation mode, and the duration of the fifth operation mode of the first device; and
   to establish the first connection between the first device and the second device, the system is further caused to:
   determine that the second operation mode of the first device does not match the third operation mode of the second device; and
   switch, in response to the determination that the second operation mode of the first device does not match the third operation mode of the second device, the operation mode of the first device from the second operation mode to the fifth operation mode based on the one or more first parameters relating to the first device.

6. The system of claim 2, wherein the second device further has a fourth operation mode and the one or more second parameters relating to the second device further includes a duration of the fourth operation mode of the second device, and wherein:
   the duration of the fourth operation mode of the second device is greater than a sum of the duration of the first operation mode and the duration of the second operation mode of the first device; and
   to establish the first connection between the first device and the second device, the system is further caused to:
   determine that the first operation mode of the first device does not match the third operation mode of the second device; and
   switch, in response to the determination that the first operation mode of the first device does not match the third operation mode of the second device, the operation mode of the second device from the third operation mode to the fourth operation mode based on the one or more second parameters relating to the second device.

7. The system of claim 1, wherein the first device is an IP camera and the second device is a network video storage, or the first device is the network video storage and the second device is the IP camera.

8. The system of claim 1, wherein the duration of the first operation mode of the first device is equal to or greater than twice a time needed for the establishing the first connection between the first device and the second device when the first device operates in the first operation mode.

9. The system of claim 1, wherein the second device further has a sixth operation mode, and the one or more second parameters relating to the second device further includes a duration of the sixth operation mode of the second device, and after establishing the first connection between the first device and the second device, the system is further caused to:
- determine that an operation criterion of the first device is not satisfied;
- switch, in response to the determination that the operation criterion of the first device is not satisfied, the operation mode of the first device from the first operation mode to the second operation mode;
- switch the operation mode of the second device from the third operation mode to the sixth operation mode based on the one or more second parameters relating to the second device;
- determine that the second operation mode of the first device matches the sixth operation mode of the second device; and
- establish, in response to the determination that the second operation mode of the first device matches the sixth operation mode of the second device, a second connection between the first device and the second device.

10. The system of claim 9, wherein the operation criterion relates to at least one of data transmission speed, data transmission distance, or bandwidth.

11. The system of claim 9, wherein the system is further caused to:
- keep, in response to the determination that the operation criterion of the first device is satisfied, the first device and the second device operating in their respective operation modes when the first connection is established.

12. The system of claim 9, wherein the first device has a first data transmission speed in the first operation mode and a second data transmission speed in the second operation mode, and the second data transmission speed is higher than or equal to the first data transmission speed.

13. The system of claim 9, wherein to switch, in response to the determination that the operation criterion of the first device is not satisfied, the operation mode of the first device from the first operation mode to the second operation mode, the system is further caused to:
- keep the first device operating in the second operation mode for a time longer than a sum of the duration of the third operation mode and the duration of the sixth operation mode.

14. A method comprising:
- determining one or more first parameters relating to a first device, the first device having a first operation mode and a second operation mode, the one or more first parameters relating to the first device including a duration of the first operation mode and a duration of the second operation mode;
- determining one or more second parameters relating to a second device, the second device having a third operation mode, the one or more second parameters relating to the second device including a duration of the third operation mode, the duration of the third operation mode of the second device being greater than a sum of the duration of the first operation mode and the duration of the second operation mode of the first device; and
- establishing a first connection between the first device and the second device based on the determined one or more first parameters relating to the first device and the determined one or more second parameters relating to the second device.

15. A method comprising:
- providing one or more second parameters relating to a second device, the second device having a third operation mode, the one or more second parameters relating to the second device including a duration of the third operation mode;
- receiving a connection request from a first device, the first device having a first operation mode and a second operation mode, one or more first parameters relating to the first device including a duration of the first operation mode and a duration of the second operation mode, the duration of the third operation mode of the second device being greater than a sum of the duration of the first operation mode and the duration of the second operation mode of the first device; and
- establishing, in response to the received connection request, a first connection between the first device and the second device based on the one or more first parameters relating to the first device and the one or more second parameters relating to the second device.

16. The method of claim 15, wherein the establishing the first connection between the first device and the second device includes:
- detecting that the first device operates in the first operation mode;
- operating the second device in the third operation mode;
- determining that the first operation mode of the first device matches the third operation mode of the second device; and
- establishing, in response to the determination that the first operation mode of the first device matches the third operation mode of the second device, the first connection between the first device and the second device.

17. The method of claim 16, the establishing the first connection between the first device and the second device further including:
- determining that the first operation mode of the first device does not match the third operation mode of the second device; and
- detecting, in response to the determination that the first operation mode of the first device does not match the third operation mode of the second device, the operation mode of the first device is switched from the first operation mode to the second operation mode based on the one or more first parameters relating to the first device.

18. The method of claim 15, wherein the second device further has a sixth operation mode, and the one or more second parameters relating to the second device further includes a duration of the sixth operation mode of the second device, and after establishing the first connection between the first device and the second device, the method further includes:
- determining that an operation criterion of the first device is not satisfied;
- detecting, in response to the determination that the operation criterion of the first device is not satisfied, that the operation mode of the first device is switched from the first operation mode to the second operation mode;
- switching the operation mode of the second device from the third operation mode to the sixth operation mode based on the one or more second parameters relating to the second device;

determining that the second operation mode of the first device matches the sixth operation mode of the second device; and establishing, in response to the determination that the second operation mode of the first device matches the sixth operation mode of the second device, a second connection between the first device and the second device.

19. The method of claim 18, wherein the method further includes:

keeping, in response to the determination that the operation criterion of the first device is satisfied, the first device and the second device operating in their respective operation modes when the first connection is established.

20. The method of claim 18, wherein the first device has a first data transmission speed in the first operation mode and a second data transmission speed in the second operation mode, and the second data transmission speed is higher than or equal to the first data transmission speed.

* * * * *